US012663983B1

(12) United States Patent
Hirani et al.

(10) Patent No.: US 12,663,983 B1
(45) **Date of Patent: \*Jun. 23, 2026**

(54) DYNAMIC PATCH MANAGEMENT SYSTEM AND METHOD

(71) Applicant: NinjaOne, LLC, Oldsmar, FL (US)

(72) Inventors: Rahul Hari Hirani, Austin, TX (US);
Peter Bretton, Harvard, MA (US); Joel Carusone, Austin, TX (US)

(73) Assignee: NinjaOne, LLC, Oldsmar, FL (US)

( \* ) Notice: Subject to any disclaimer, the term of this patent is extended or adjusted under 35 U.S.C. 154(b) by 0 days.

This patent is subject to a terminal disclaimer.

(21) Appl. No.: 19/564,452

(22) Filed: Mar. 12, 2026

Related U.S. Application Data

(63) Continuation of application No. 19/411,591, filed on Dec. 8, 2025, now Pat. No. 12,602,223.

(51) Int. Cl.
G06F 8/65 (2018.01)

(52) U.S. Cl.
CPC ..................................... G06F 8/65 (2013.01)

(58) Field of Classification Search
None
See application file for complete search history.

(56) References Cited

U.S. PATENT DOCUMENTS

| | | | | |
|---|---|---|---|---|
| 11,249,743 B2 * | 2/2022 | Cannon | .................. | G06N 3/088 |
| 11,907,696 B2 * | 2/2024 | Livne | ........................ | G06F 8/62 |
| 12,417,140 B1 * | 9/2025 | Shum | .................... | G06F 11/079 |
| 2013/0041717 A1 * | 2/2013 | Ratterman | ............. | G06Q 30/06 |
| | | | | 705/7.29 |
| 2019/0102255 A1 * | 4/2019 | O'Malley | ........... | G06F 11/0793 |
| 2020/0057625 A1 * | 2/2020 | Livne | ........................ | G06F 8/65 |
| 2021/0019135 A1 * | 1/2021 | Hwang | ................ | G06F 9/4881 |
| 2021/0390187 A1 * | 12/2021 | Ahmed | ................ | G06F 21/577 |

OTHER PUBLICATIONS

Reddy, "Machine Learning for Patch Impact Analysis in Red Hat", 2022, International Journal of Science, Engineering and Technology (Year: 2022).*

(Continued)

*Primary Examiner* — Hossain M Morshed
(74) *Attorney, Agent, or Firm* — Nicholas Pfeifer

(57) ABSTRACT

Systems and methods are disclosed for managing deployment of software patches across a plurality of client devices. A patch management server acquires vendor-supplied patch data, community-sourced patch data, and/or platform-based data, and evaluates the information using weighting logic that may be implemented by a machine-learning model trained on historical patch outcomes. Based on the weighted evaluation, the system generates a bounded risk representation indicating a likelihood that installation of the patch will have a particular effect on one or more client devices. The server selects a deployment action in accordance with the bounded risk representation and may generate and update deployment rings defining the order in which devices receive the patch. Deployment rings may be dynamically recalculated in response to updated data or anomaly conditions, and post-deployment monitoring may trigger rollback actions when thresholds are satisfied.

20 Claims, 6 Drawing Sheets

(56)          References Cited

OTHER PUBLICATIONS

Baysal, "The Secret Life of Patches: A Firefox Case Study", 2012, IEEE (Year: 2012).*

Jenkins, "To Patch, or not To Patch? That is the question: A Case Study of System Administrators' Online Collaborative Behaviour", 2023, ACM (Year: 2023).*

Sethanandha, "Managing Open Source Contributions for Software Project Sustainability", 2010, IEEE (Year: 2010).*

* cited by examiner

Present an administrative interface to technician
302

Integrates these technician-defined inputs
into the evaluation process
304

Present risk profile to technician
306

Present the recommended deployment action to
the technician with override option(s)
308

Provide technician approved or selected
deployment action to system
310

400

DYNAMIC PATCH MANAGEMENT SYSTEM AND METHOD

PRIORITY INFORMATION

This nonprovisional application is a continuation of and claims priority to nonprovisional application Ser. No. 19/411,591, entitled "Dynamic Patch Management System and Method," filed Dec. 8, 2025, by the same inventors.

FIELD OF THE DISCLOSURE

Aspects of the present disclosure generally relate to systems and methods for managing deployment of software patches and updates.

BACKGROUND

In current practice, the evaluation of software patches prior to installation is primarily performed manually by technicians. A technician may delay deployment of a newly released patch to allow time for potential issues to surface in the broader user community. After waiting, the technician often searches publicly available sources for reports of problems attributed to the patch, such as incompatibilities with certain operating systems or failures of specific device components.

Based on these findings, the technician makes a judgment call as to whether and where to deploy the patch. This judgment may involve avoiding certain environments where problems have been reported, or weighing the benefits of the patch, such as improved security, against the risks of introducing new failures.

While this manual approach can reduce the likelihood of widespread disruption, it suffers from several shortcomings. The process is time-consuming, depends heavily on the skill and discretion of individual technicians, and lacks a consistent or programmatic mechanism for incorporating external findings into deployment decisions. Furthermore, conventional approaches do not dynamically adjust deployment strategies once new information or updated patch versions become available.

Accordingly, there exists a need for improved systems and methods that can evaluate patch deployment decisions in a structured, repeatable manner, while incorporating external research and enabling dynamic, ongoing adjustments to deployment strategies. However, in view of the art considered as a whole at the time the present invention was made, it was not obvious to those of ordinary skill in the field of this invention how the shortcomings of the prior art could be overcome.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

BRIEF SUMMARY

Aspects of the present disclosure generally relate to methods, systems, and non-transitory computer-readable media for managing deployment of software patches across a plurality of client devices as substantially described herein and as illustrated in the accompanying drawings and specification. In some embodiments, the aspects may include combinations or sub-combinations of the elements described herein, as would be understood by one of ordinary skill in the art.

Some implementations of the present invention described herein relate to a computer-implemented method for managing deployment of a software patch to client devices. In some embodiments, the method includes: receiving, by a patch management server, vendor-supplied patch data associated with the software patch; receiving community-sourced patch data originating from one or more sources other than a patch vendor or the patch management server; receiving platform-based data originating from one or more of the client devices; applying a weighting procedure to at least a portion of the vendor-supplied patch data, the community-sourced patch data, and the platform-based data to generate a weighted evaluation of the software patch; generating, based on the weighted evaluation, a bounded risk representation indicative of a likelihood that installation of the software patch will adversely affect at least one of the client devices; selecting, based on the bounded risk representation, a deployment action for the software patch; and executing the deployment action.

In various implementations, the method may further include: acquiring community-sourced patch data by accessing public internet forums; collecting platform-based data (e.g., telemetry or performance data) across the client devices; retrieving vendor-supplied patch information from a vendor distribution service; applying threshold values to map weighted evaluations to bounded risk levels; evaluating the community-sourced patch data based on credibility, report volume, relevance to client configurations, or cross-source consistency; generating the bounded risk representation on a per-device, per-group, or fleet-wide basis; performing the weighting procedure using a machine-learning model trained on historical patch data and deployment outcomes; generating deployment rings based on device-classification information; deploying the patch according to the deployment rings; dynamically recalculating the deployment rings in response to updated platform-based data; monitoring post-deployment telemetry; and initiating a rollback when anomaly metrics satisfy predefined thresholds.

Some implementations of the present invention described herein relate to a system for managing deployment of a software patch. In some embodiments, the system includes one or more processors and a memory storing instructions that, when executed, cause the system to: acquire vendor-supplied patch data; acquire platform-based data comprising telemetry or performance data from one or more client devices; acquire community-sourced patch data originating from sources other than a patch vendor or a patch management platform; process at least a portion of the vendor-supplied, community-sourced, and platform-based data using a machine-learning model trained on historical patch data and deployment outcomes; generate, by the machine-learning model, a bounded risk representation indicative of a likelihood that installation of the patch will adversely affect at least one client device; select a deployment action based on the bounded risk representation; and cause execution of the deployment action on the client devices.

In various embodiments, the system may include additional features or instructions for performing tasks such as: acquiring community-sourced patch data via public internet forums; collecting platform-based data from client devices over a network; retrieving vendor information from a vendor distribution service; generating bounded risk values based on threshold mapping; evaluating community-sourced patch data according to credibility, volume, relevance, or consistency; generating and deploying according to multiple deployment rings; dynamically recalculating deployment rings based on updated platform-based data; monitoring post-deployment data; and initiating rollout suspension or rollback when anomaly conditions are detected.

Some implementations of the present invention described herein relate to a non-transitory computer-readable medium storing instructions that, when executed by one or more processors of a patch management system, cause the processors to acquire vendor-supplied patch data associated with a software patch; acquire platform-based data from client devices; acquire community-sourced patch data originating from sources other than a patch vendor or a patch management platform; process at least a portion of the acquired patch data using a machine-learning model trained on historical patch data and historical deployment outcomes; generate, using the machine-learning model, a bounded risk representation indicative of a likelihood that installation of the software patch will adversely affect at least one client device; generate a plurality of deployment rings based on the bounded risk representation and device-classification information; dynamically recalculate at least one of the deployment rings in response to updated platform-based data; select a deployment action based on the bounded risk representation and the deployment rings; and cause execution of the deployment action.

In some embodiments, the non-transitory computer-readable medium may include instructions for performing any of the additional features described herein, including: generating risk scores at varying scopes; applying threshold-based mapping to risk evaluations; analyzing credibility, volume, relevance, or consistency of community-sourced information; advancing or deferring deployment rings based on telemetry feedback; or executing rollback actions when anomaly metrics exceed defined thresholds.

The foregoing description provides an overview of certain features and technical advantages of examples of the present disclosure to facilitate a better understanding of the detailed description that follows. Additional features, variations, and advantages will be described below. The concepts and specific examples disclosed herein may be utilized as a basis for modifying or designing other structures or methods to achieve the same or similar purposes as those of the present disclosure. Equivalent constructions, implementations, and variations are considered to fall within the scope of the appended claims. Characteristics of the concepts disclosed herein, including their organization, method of operation, and associated advantages, will be further understood from the following description when considered with the accompanying drawings. Each of the figures is provided for illustration and explanation only and is not intended to limit the scope of the claims.

BRIEF DESCRIPTION OF THE DRAWINGS

The appended drawings are provided to facilitate a more detailed understanding of the features of the present disclosure and to support the following specific description. The disclosure is described below with reference to certain aspects, some of which are illustrated in the appended drawings. It should be understood that the appended drawings depict only illustrative examples of the disclosure and are therefore not to be considered as limiting its scope, as the description may encompass other equally effective implementations. In some instances, the same reference numbers in different drawings may be used to identify the same or similar elements for ease of understanding.

Figure 1:
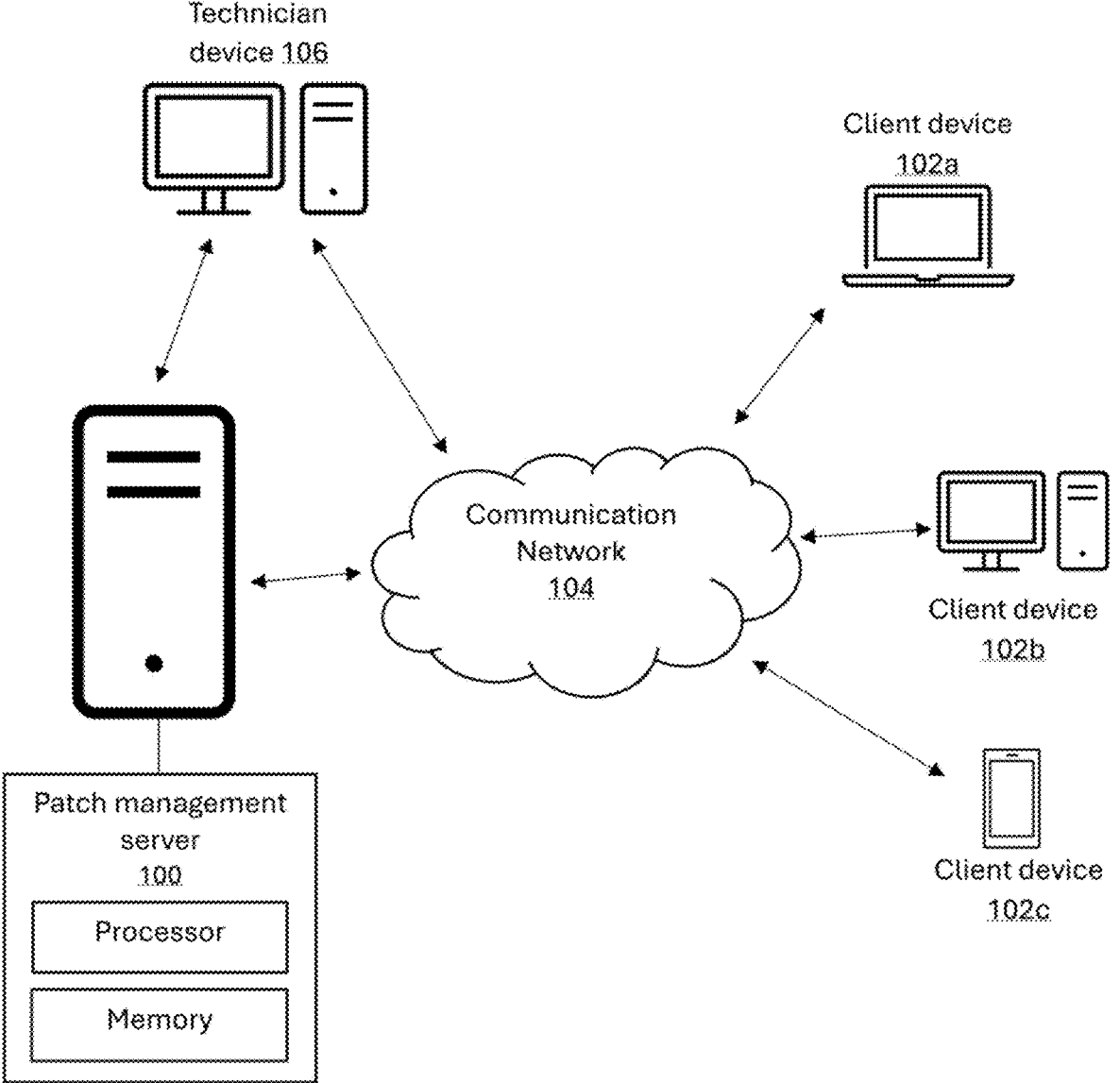

FIG. 1 is a block diagram in accordance with some aspects of the present invention.

Figure 2:
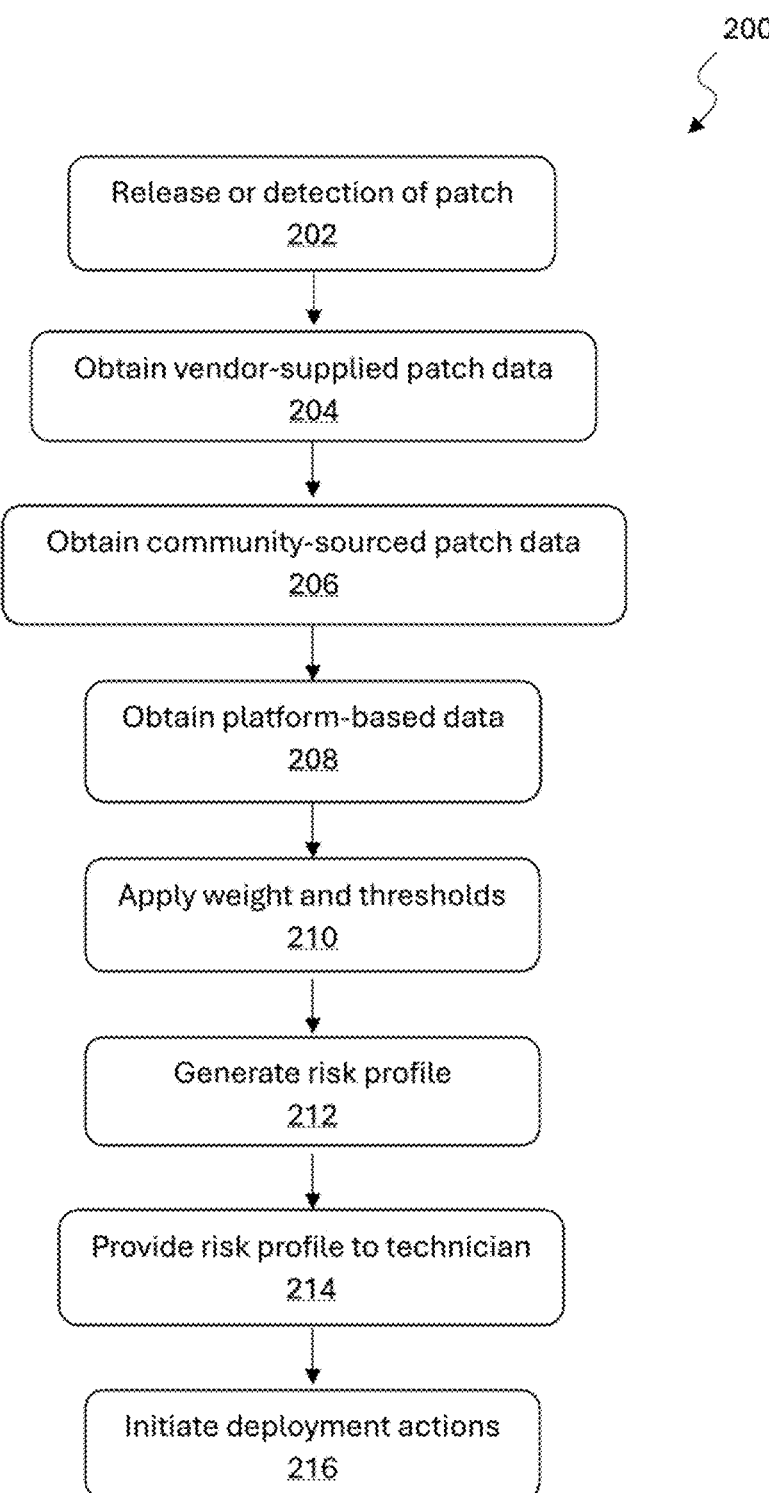

FIG. 2 is a flow chart in accordance with some aspects of the present invention.

Figure 3:
Figure 3:
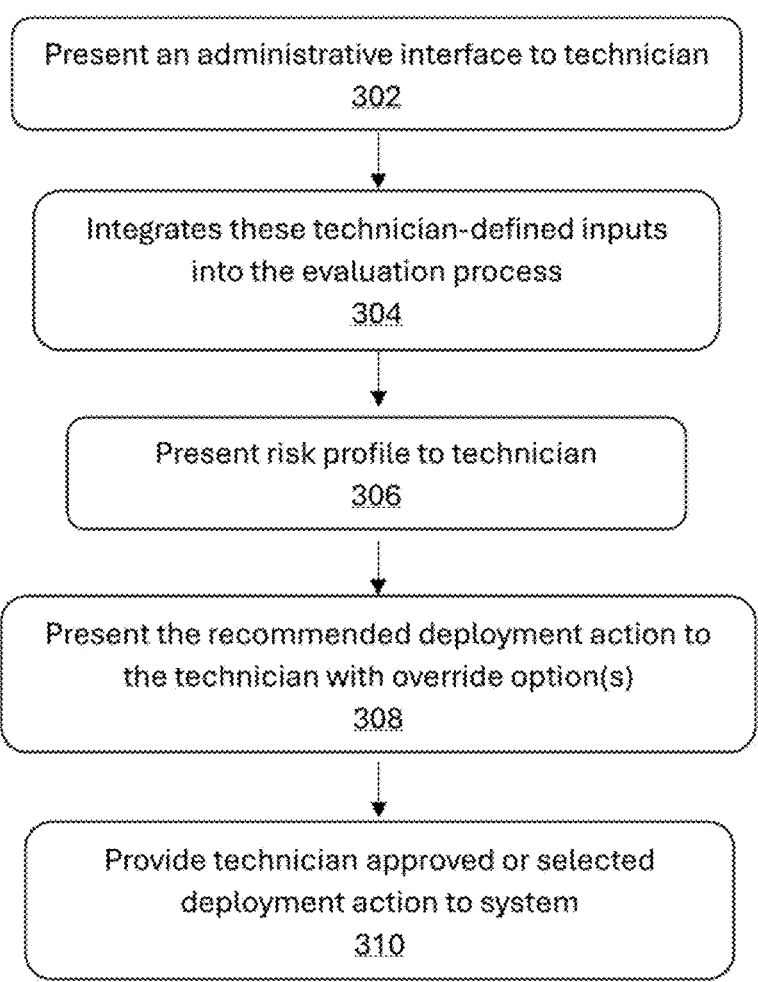

FIG. 3 is a flow chart in accordance with some aspects of the present invention.

Figure 4:
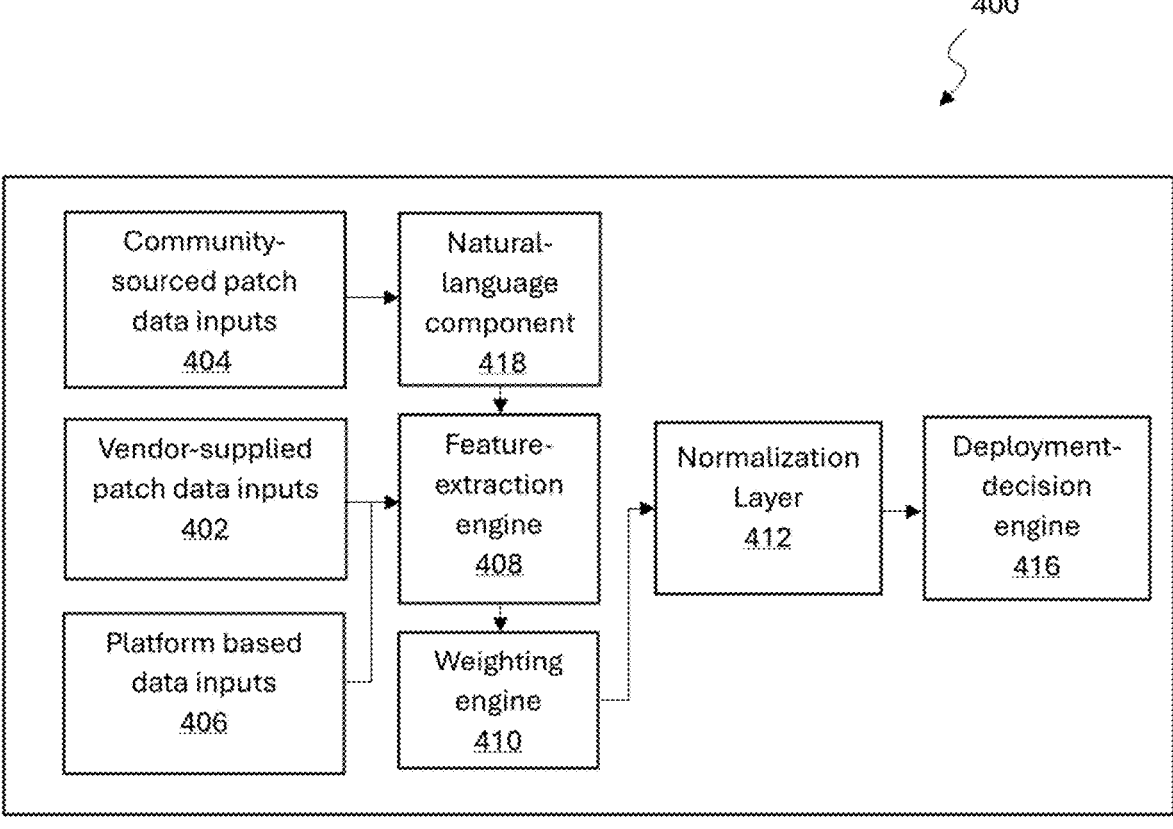

FIG. 4 is a block diagram in accordance with some aspects of the present invention.

Figure 5:
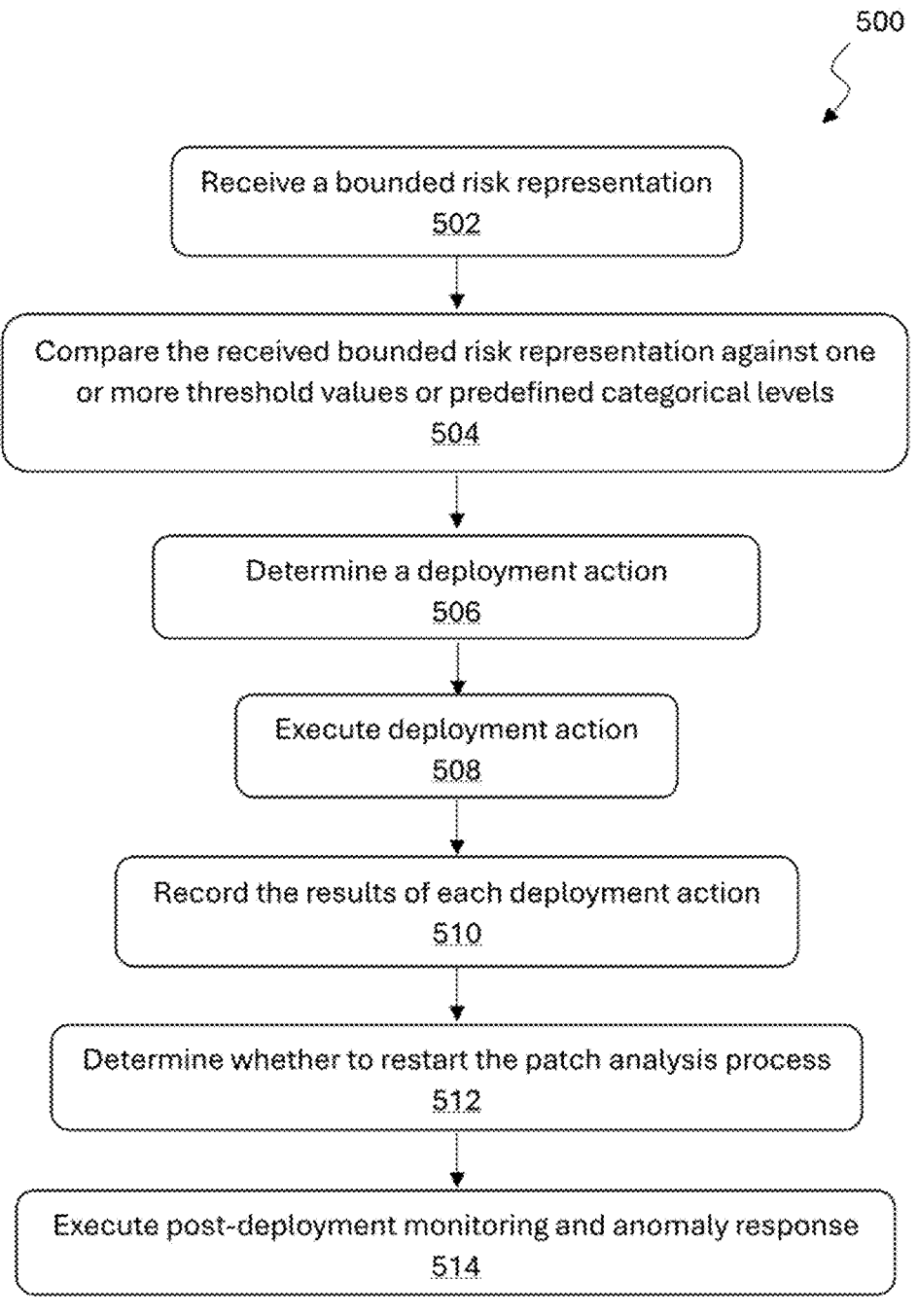

FIG. 5 is a flow chart in accordance with some aspects of the present invention.

Figure 6:
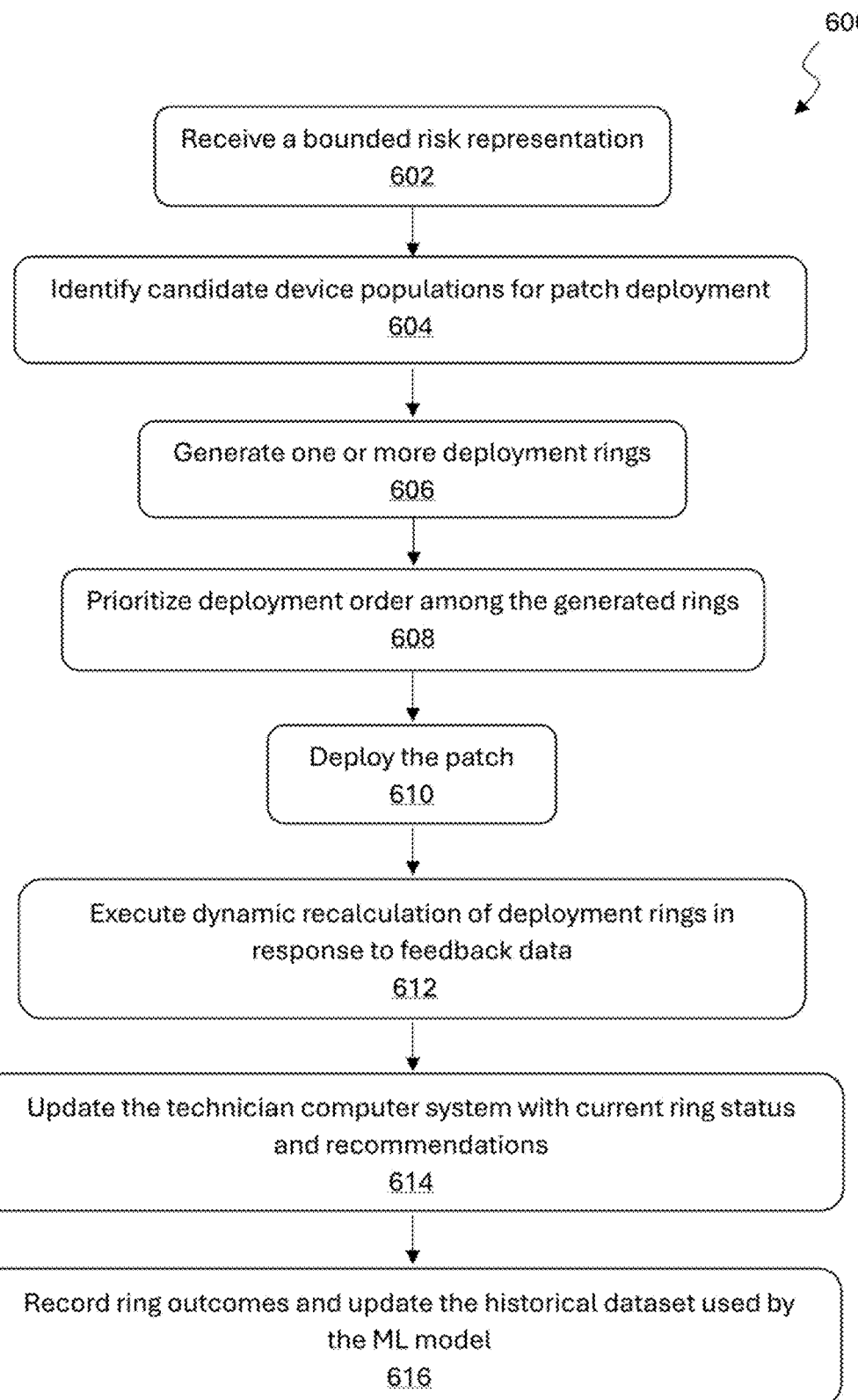

FIG. 6 is a flow chart in accordance with some aspects of the present invention.

DETAILED DESCRIPTION OF THE INVENTION

In the following detailed description of the present invention, reference is made to the accompanying drawings, which form a part thereof, and within which are shown by way of illustration specific embodiments by which the invention may be practiced. Numerous specific details are set forth to provide a thorough description of the embodiments of the present invention. It will be appreciated that the embodiments described herein are illustrative and not limiting. Features, functions, elements, and components described in connection with any embodiment may be combined with features, functions, elements, and components of other embodiments, in whole or in part, unless otherwise stated. Likewise, individual features may be implemented independently of other features, or in different combinations, as would be understood by a person of ordinary skill in the art. The invention therefore encompasses all variations, modifications, and equivalents that fall within the scope of the appended claims, including embodiments having any combination of the features described herein. It is to be understood that other embodiments may be utilized, and structural changes may be made without departing from the scope of the invention.

The relevant descriptions of such features may apply equally to the features and related components among all the drawings. For example, any suitable combination of the features, and variations of the same, described with components illustrated in FIG. 1, can be employed with the components of FIG. 2, and vice versa. This pattern of disclosure applies equally to further embodiments depicted in subsequent figures and described hereinafter. It should be understood that the figures presented are not meant to be illustrative of actual views of any particular portion of the actual structure or method but are merely idealized representations employed to more clearly and fully depict the present invention defined by the claims below.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

The phrases "in some embodiments," "according to some embodiments," "in the embodiments shown," "in other embodiments," and the like generally mean the particular feature, structure, or characteristic following the phrase is included in at least one implementation. In addition, such phrases do not necessarily refer to the same embodiments or different embodiments.

When language similar to "at least one of A, B, or C" or "at least one of A, B, and C" is used in the specification or claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

As used herein, the phrase "satisfying a threshold" may, depending on the context, refer to a value that is greater than, greater than or equal to, less than, less than or equal to, equal to, not equal to, or otherwise compared to the threshold, as appropriate.

Also, as used herein, the terms "coupled," "coupling," or any other variation thereof, are intended to cover a physical connection, an electrical connection, a magnetic connection, an optical connection, a communicative connection, a functional connection, a thermal connection, and/or any other connection.

Various aspects of the present disclosure are described below with reference to different apparatuses, systems, and techniques. These apparatuses, systems, and techniques are discussed in the following detailed description and are illustrated in the accompanying drawings by way of blocks, modules, components, circuits, steps, processes, algorithms, and/or similar structures (collectively referred to as "elements"). These elements may be implemented using hardware, software, firmware, or any combination thereof. Whether such elements are implemented as hardware, software, or otherwise depends on the particular application, implementation, and design constraints of the overall system.

As used herein, the term "component" should be interpreted broadly to include hardware, firmware, software, and/or any combination thereof. Likewise, as used herein, the term "processor" may refer to an implementation in hardware, firmware, software, and/or any combination thereof.

As used herein, the term "software patch" refers to any update, modification, or replacement to existing software, firmware, configuration data, or system components. Non-limiting examples include security updates, bug fixes, feature updates, driver updates, performance optimizations, compatibility updates, service-pack rollups, configuration changes, version upgrades, or any other update mechanism provided by a software vendor or update service. A software patch may be delivered as one or more files, manifests, scripts, instructions, or packages, and may be distributed through any suitable mechanism, including vendor distribution services, repositories, or network-based delivery systems. The foregoing examples are non-limiting, and the term "software patch" encompasses any present or future form of software update.

As used herein, the term "patch management server" or "patch management platform" refers to any computing system, distributed service, cloud platform, or combination thereof configured to evaluate, schedule, coordinate, or control deployment of software patches across one or more client devices. The patch management server may include processors, memory, networking components, data stores, or machine-learning components, and may perform functions including, but not limited to, receiving patch-related data, collecting telemetry, performing risk evaluation, generating deployment strategies, controlling patch rollout, monitoring post-deployment performance, storing historical outcomes, and facilitating technician input. The patch management server may operate as a single device, a cluster of devices, a cloud-hosted service, a hybrid on-premises/cloud environment, or any other architecture suitable for patch management operations. The term is non-limiting and encompasses any present or future system configured to perform patch-management-related functions.

As used herein, the term "patch vendor" refers to any entity, service, or system that originates, maintains, or distributes a software patch. Non-limiting examples include operating system vendors, application developers, firmware manufacturers, hardware original-equipment manufacturers (OEMs), driver providers, software publishers, cloud service providers, and update distribution services acting directly or indirectly on behalf of such entities. A patch vendor may supply patch metadata, manifests, advisories, release notes, dependency information, security bulletins, version identifiers, or any other information associated with a software patch. The term "patch vendor" is non-limiting and encompasses any present or future provider or distributor of patch-related content, regardless of delivery mechanism or organizational structure. It should be noted that a patch vendor is typically distinct from the patch management server or platform, which evaluates and controls patch deployment independently based on vendor-supplied patch data, external intelligence, platform-generated data (e.g., telemetry), or other factors.

Several aspects of systems and methods for managing deployment of software patches and updates will now be presented with reference to various apparatuses, techniques, and computing environments.

FIG. 1 illustrates an example computing environment suitable for implementing aspects of the disclosure. The environment includes a patch management server 100 communicatively coupled to one or more client devices 102a, 102b, 102c (collectively, "client devices 102") via a network 104. The environment may also include a technician computer system 106 communicatively coupled to the network 104 and/or the patch management server 100.

The patch management server 100 may include one or more processors, memory, and storage components configured to execute instructions for patch evaluation and deployment. In some embodiments, the patch management server 100 may represent a single computing system, while in other embodiments it may represent a distributed computing environment comprising multiple networked systems or subsystems that collectively perform the functions described herein. For example, one or more remote computing resources may execute a machine-learning (MVL) model or telemetry aggregation processes while other components manage patch distribution and communication with client devices 102. The server 100 may receive information about newly released patches, including metadata provided by a software vendor or update service. In some embodiments, the server 100 may also access external data sources containing reports, advisories, or discussions relating to the patch.

The client devices 102 may include desktops, laptops, mobile devices, servers, and other peripheral computing devices, each of which may execute operating systems or applications subject to updates. Although three client devices are illustrated in FIG. 1, any number of devices may be present in a given deployment environment.

The technician computer system 106 may comprise a workstation, laptop, or other computing device configured to execute an administrative interface. Through this interface, a technician may provide input on deployment strategies, such as defining acceptable risk thresholds, specifying environments to prioritize, or establishing the relative weight to be applied to security benefits versus functional risks. The technician computer system 106 may also be used to review system-generated recommendations, monitor patch deployment status, and observe outcomes across the client devices 102.

Together, the patch management server 100, client devices 102, network 104, and technician computer system 106 provide a computing environment in which the patch evaluation, grouping, and recalculation processes described herein may be implemented. Although FIG. 1 depicts a centralized server-based architecture, alternative implementations may employ distributed systems, peer-to-peer networks, or cloud-based infrastructures, each of which falls within the scope of the disclosure.

FIG. 2 illustrates an example process flow for analyzing a patch prior to deployment (referred to hereinafter as the "patch analysis process"). Process 200 may begin at step 202 with the release or detection of a newly available patch. In some embodiments, initiation of the patch analysis process at step 202 occurs automatically upon receipt of the patch and/or associated internal patch data. Internal patch data may be delivered automatically, for example, from a vendor distribution service, repository synchronization process, or third-party aggregator. Other delivery mechanisms may likewise be used, and the foregoing examples are non-limiting.

In some aspects, the patch management server 100 may be configured to periodically query one or more repositories or update services, and to automatically initiate the patch evaluation process 200 upon detection of a newly available patch. By automatically commencing evaluation in response to delivery or detection, the system reduces reliance on manual intervention and provides a more consistent, timely approach to patch management.

At step 204, the patch management server 100 obtains vendor-supplied patch data. As used herein, vendor-supplied patch data refers to information originating from the patch vendor or included within the patch package itself. Non-limiting examples include version identifiers, target operating systems, dependency information, security advisories, digital signatures, file sizes, checksums, release notes, installation instructions, compatibility matrices, change logs, and machine-readable descriptors embedded within the patch package. These examples are non-limiting, and other vendor-sourced data may likewise be used.

At step 206, the patch management server 100 obtains public or third-party patch data (collectively referred to hereinafter as "community-sourced patch data"). As used herein, community-sourced patch data refers to information originating from sources other than the patch vendor or the patch management platform. Such sources may include but are not limited to public advisories, independent security bulletins, online discussion forums, user communities, crowdsourced error repositories, third-party technical blogs, automated vulnerability feeds, social media reports, or enterprise support channels. Community-sourced patch data may include qualitative descriptions of observed problems, such as loss of device functionality, driver conflicts, or performance degradation, as well as quantitative measures, such as frequency of occurrence, number of systems affected, geographic distribution of reports, or severity ratings provided by independent entities.

In some embodiments, at step 208, the patch management server 100 retrieves or obtains platform-based data. Platform-based data may provide quantitative, objective evidence of patch behavior across diverse environments and may be received in real time or near-real time in automated fashion. As used herein, platform-based data refer to data generated or acquired from client devices 102 and/or from the patch management system/platform configured to evaluate, schedule, coordinate, or control deployment of software patches across one or more client devices 102. Such data may be based on real-world deployment outcomes, such as telemetry and performance data of client devices 102. Platform-based data may be in the form of machine-generated signals collected from client devices 102 or from third-party monitoring services during or after patch deployment. Such analytics may include operating system configuration and version identifiers, software configuration data, software inventory data, hardware configuration data, driver versions, system resource utilization, success rates, failure rates, installer exit codes, rollback events, rollback rates, crash reports, IT-ticket reporting, IT-ticket timing relative to patch deployment, device-level event logs, configuration snapshots, resource-utilization metrics, or other machine-generated indicators of patch performance. In some aspects, platform-based data may also include user information such as department and role, location, time zone, holiday schedule, etc. Platform-based data may be generated or analyzed at multiple scopes, including per-device, across a set of devices within a particular organization or tenant, across devices belonging to a broader industry segment, across all devices managed by a particular patch-management platform, or across devices associated with multiple independent patch-management systems. These examples are non-limiting, and platform-based data may be grouped, partitioned, or analyzed according to any other present or future organizational scheme, including combinations or variations of the foregoing.

The collection of vendor-supplied patch data, community-sourced patch data, and platform-based data may be performed automatically by the patch management server 100 through scheduled searches, periodic crawling of data sources, and/or continuous monitoring of feeds. In some embodiments, the system initiates collection after a predetermined waiting period following a patch release. The waiting period may be fixed, configurable by a technician through the technician computer system 106, or dynamically adjusted by an automated decision process. In another embodiment, the system may begin collection immediately upon patch release and apply time-based thresholds that dictate whether to continue waiting for additional findings. For example, if a sufficient number of reports are detected, or if findings indicate a high-severity issue, the system may proceed to the next step without delay. Conversely, if insufficient or inconclusive findings are available, the system may defer further evaluation until additional vendor-supplied patch data, community-sourced patch data, and/or platform-based data has been gathered. The manner and timing of collection are not restricted to these examples and may vary depending on the deployment environment and available data sources.

In some embodiments, the patch management server 100 executes or orchestrates an agentic retrieval component configured to autonomously discover, collect, and/or summarize vendor-supplied patch data, community-sourced patch data, and/or platform-based data. The agentic retrieval component may be an AI model or system. In addition, the agentic retrieval component may perform goal-directed actions such as issuing search queries, following source-specific APIs, crawling discussion forums, visiting vendor and CERT advisory pages, and revisiting previously identified sources according to a schedule or change-detection triggers. The component may employ utilities including but not limited to a headless browser, rate-limited HTTP client, robots.txt compliance module, and/or provenance logging to record the origin and time of each finding.

In some aspects, the agentic retrieval component operates in iterative cycles including (i) generation of candidate search terms or API queries from patch identifiers, (ii) execution of those queries against registered data sources, (iii) parsing of returned documents using pattern-matching and entity extraction modules, and (iv) updating of a query-state model based on retrieved relevance scores. Query scheduling may be driven by a reinforcement loop that increases revisit frequency for historically informative sources.

The agentic retrieval component may maintain source registries and topic trackers keyed to patch identifiers, operating system builds, and/or hardware classes. As new posts or advisories are discovered, the component may deduplicate near-duplicate content, extract entities (e.g., driver name, device model), and generate structured summaries (e.g., symptom, severity phrasing, affected versions). These summaries are passed to the weighting stage together with provenance metadata (e.g., publisher domain, author signals, timestamp, cross-links) so that credibility can be assessed downstream.

Agent policies (e.g., risk tolerance settings, which domains to prioritize, crawl cadence, and language/locale coverage) may be technician-configurable via the technician computer system 106 and/or adaptively tuned based on downstream outcomes. For example, sources that historically correlate with verified failures may be prioritized, whereas sources that produce unsubstantiated claims may be deprioritized or filtered.

At step 210, the patch management server 100 applies weighting and/or thresholds to the vendor-supplied patch data, community-sourced patch data, and/or platform-based data. The weights may be manually determined and adjusted or automatically established. Weighting factors may include but are not limited to the credibility or trust level of their sources, the volume of reports, the relevance of reported issues to the particular client devices 102, the severity of the issues described, and the consistency of findings across multiple sources. In some implementations, weighting may be guided by technician-defined parameters, such as specifying that security benefits above a given magnitude outweigh certain classes of functional issues. In other implementations, weighting may be determined dynamically through machine learning models trained on prior patch outcomes. In some aspects, the system may employ any suitable weighting technique or combination thereof, depending on design preferences or available resources.

In some embodiments, platform-based data may include telemetry and other device-level performance indicators, enabling the patch management server 100 to calculate weighting values on a per-device or per-device-group basis. Device-specific attributes, such as hardware configuration, operating system version, installed drivers, recent stability patterns, observed anomaly history, or other platform-based data, may therefore influence the weighting assigned to particular findings. By incorporating such individualized environmental factors into the weighting process, the system may more accurately determine the expected operational impact of a medium-likelihood, high-severity issue across heterogeneous client environments, thereby generating a more precise and context-sensitive risk assessment for downstream deployment decisions.

In some aspects, an aggregate patch weighting score W may be computed as:

$$W = \Sigma_i (w_i \times x_i) | \qquad \text{Equation 1}$$

where $x_i$ represents normalized feature values (e.g., report volume, credibility, severity, consistency, relevance, etc.) and $w_i$ represents weighting coefficients derived from technician-defined parameters or learned by the machine-learned model 400. These weights may be periodically updated using gradient-based optimization or regression fitting to historical outcome data, allowing the system to refine predictive accuracy for subsequent patch evaluations. Alternative weighted scores may also be calculated based on the features described herein.

Credibility may be quantified as a source-level score and/or a claim-level score. The source-level score may incorporate factors such as publisher category (vendor, CERT, enterprise IT blog, public forum, etc.), historical precision and/or recall of prior reports against verified outcomes, domain reputation, author history, and/or linkage to authoritative references. The claim-level score may consider corroboration across independent sources, temporal recency, internal consistency, and/or environmental alignment with the enterprise fleet (e.g., same OS build, driver family, and/or device model).

In some aspects, the overall credibility weight C may be computed as:

$$C = \alpha S_s + \beta S_c \qquad \text{Equation 2}$$

where $S_s$ is the source-level score and $S_c$ is the claim-level score. Coefficients $\alpha$ and $\beta$ define the relative influence of each score and may be configured by the technician or automatically tuned through adaptive training. The credibility weight is normalized between 0 and 1 and directly supplied to the weighting engine 410 for downstream analysis.

In some aspects, technician-defined parameters establish minimum credibility thresholds (for example, disregarding findings below a threshold unless corroborated by multiple independent reports). Thresholds may be scoped to deployment context (e.g., production vs. testing environments) and mapped to distinct system actions such as deferral, suspension, or rollback.

In some aspects, credibility is determined by an ML model (e.g., ML model 400 disclosed below), which identifies patterns between data features and historical deployment outcomes. The model may learn that certain phrasing, evidence types, or report clusters are predictive of actual regressions. In some cases, the model's learned credibility outputs are calibrated and merged with technician-defined parameters, producing a hybrid approach in which operator-defined guardrails bound an adaptive, data-driven assessment.

Credibility parameters may be continuously adapted based on feedback from telemetry outcomes. For example, if a given forum community's early reports repeatedly precede confirmed failures, its credibility weighting may be increased; conversely, repeatedly inaccurate sources may be automatically downweighted. Adaptation may occur periodically, upon detection of distributional drift, or during scheduled model retraining cycles.

In some embodiments, credibility of a source may be determined using a hybrid approach that combines fixed and adaptive reputation data. A first component may include a set of hardcoded reputable sources, such as recognized technology news outlets, vendor advisories, and security bulletins. A second component may operate as a dynamic reputation service that assigns credibility scores to online sources based on link frequency, cross-references, and other network-level indicators, similar to the manner in which search engines rank content.

In certain embodiments, social platforms such as Reddit may be handled using specialized heuristics. For example, early signals of potential vulnerabilities or incidents may be extracted from threads, but their credibility may be adjusted based on the poster's historical activity, tenure, and prior accuracy within IT-related communities. Over time, the system may build individualized trust profiles for reporting users, allowing early but low confidence reports to later be validated or deprioritized based on retrospective accuracy data.

The volume of reports associated with a patch or issue may be used as a quantitative weighting factor. In some embodiments, the patch management server 100 and/or an associated ML model aggregates report counts across one or more community-sourced patch data sources and computes statistical measures such as frequency, rate of new occurrences over time, or growth slope. These metrics indicate whether the issue is isolated, emerging, or widespread. For example, a sudden increase in the number of distinct reports referencing a particular patch identifier or symptom may trigger an escalation in the corresponding risk weighting. Conversely, a static or declining report rate may lower weighting. Volume analysis may also consider unique source diversity, ensuring that multiple reports from the same domain or author are discounted to prevent artificial inflation of issue prevalence.

In some aspects, technician-defined parameters may establish thresholds for minimum report volume before an issue is considered credible for weighting. For instance, a policy may specify that fewer than five independent occurrences within a 24-hour period should not alter a patch's baseline risk score. Alternatively, an exponential weighting function may be used, in which each additional independent report contributes diminishing marginal risk until a saturation threshold is reached. In ML implementations, the model may learn non-linear relationships between report volume and historical failure outcomes, such that small volumes from high-credibility sources may carry greater weight than large volumes from low-credibility forums.

The relevance of reported issues to the particular client devices 102 may serve as another weighting dimension. The relevance of a reported issue may be based on platform-based data, which may include telemetry, device-level performance indicators, and/or device- or organization-level usage patterns, thereby enabling the patch management server 100 to calculate weighting values on a per-device or per-device-group basis. Relevance may also be determined by comparing contextual attributes of community-sourced patch data against the configuration profiles of the client devices 102. Non-limiting attributes used for relevance scoring may include hardware vendor and model identifiers, operating system version, driver versions, installed applications, usage data, and/or regional or language settings. The patch management server 100 may maintain a device profile database or obtain configuration snapshots from client devices 102 to enable direct correlation with community-sourced patch data. Reports describing problems affecting components or configurations not present in the enterprise environment may be automatically downweighted or excluded from risk calculations.

For example, if a known issue relates to USB-based printing functionality, the system may evaluate usage data indicating how frequently devices within a given client environment initiate print operations. In a technology-focused organization where print activity is infrequent, the breadth-of-impact weighting for such an issue may be correspondingly low. In contrast, in an environment such as a legal services organization where a substantial percentage of devices regularly perform printing operations, the same issue may receive a materially higher weighting. By incorporating such individualized environmental factors into the weighting process, the system may more accurately determine the expected operational impact of a medium-likelihood, high-severity issue across heterogeneous client environments, thereby generating a more precise and context-sensitive risk assessment for downstream deployment decisions.

In some implementations, relevance thresholds may be technician-configurable, allowing an administrator to specify strict or lenient similarity criteria depending on deployment sensitivity. For example, in a highly standardized data center environment, the patch management server 100 may consider only reports matching exact hardware and software versions as relevant. In contrast, for heterogeneous enterprise fleets, broader matching criteria (e.g., same OS family or driver vendor) may be used. In ML configurations, the model may learn embeddings or similarity metrics that capture complex relationships between configurations, enabling it to generalize relevance across partially overlapping device classes.

The severity of the issues described within community-sourced patch data is another factor that may influence overall weighting. Severity may be classified according to the impact level on system stability, performance, or security. For example, a reported kernel crash or data corruption event may carry a higher weighting than a temporary display flicker or minor user interface error. The patch management server 100 may employ a rule-based classifier or the natural-language component 418 of the ML model to extract and interpret severity descriptors from text (e.g., "critical," "minor," "temporary workaround"). Severity signals may also be inferred indirectly from telemetry patterns such as crash rates or system reboots.

In some embodiments, severity thresholds may be linked to action mappings within the deployment-decision engine 416 described below. For instance, patches associated with issues classified as critical may automatically trigger deferral or rollback actions, whereas minor issues may merely reduce rollout velocity or increase monitoring frequency. The weighting assigned to severity may also be conditioned by credibility; highly credible reports of moderate issues may carry more weight than uncertain reports of severe problems. The ML model may learn such joint dependencies during training, allowing it to dynamically balance severity and credibility signals.

In some embodiments, the system may allow a technician to configure severity tolerance parameters that influence how severity signals affect weighting and downstream deployment actions. Such technician-defined tolerance levels may reflect the operational criticality of the environment. For example, organizations with mission-critical systems, such as medical, industrial control, or financial infrastructure, may configure lower severity thresholds to ensure heightened caution, whereas less sensitive environments may select higher thresholds to prioritize deployment speed. These technician-defined parameters may modify the influence of severity within the weighting process and shape the resulting decision logic applied by the deployment-decision engine.

The consistency of findings across multiple sources provides an additional weighting mechanism for distinguishing isolated anomalies from systemic defects. Consistency may be quantified by analyzing the degree of overlap between independent reports describing similar symptoms, affected components, or root-cause keywords. The patch management server 100 may use natural-language similarity scoring, semantic clustering, or probabilistic topic modeling to identify cross-source alignment. When numerous independent sources consistently describe similar failures or environmental conditions, the aggregate confidence in the issue increases, resulting in higher weighting within the risk profile.

For example, in some embodiments, the aggregation of reports from multiple independent sources may be represented through a probability or confidence score (e.g., a value between 0 and 1.00 or 0% to 100%) that reflects the system's estimated likelihood that a patch or update is associated with a particular issue. In one example implementation, a score approaching 1.00 or 100% may correspond to situations in which substantially all users across substantially all trusted sources report experiencing a similar failure, or where a vendor has formally acknowledged a defect.

In some aspects, consistency analysis may incorporate temporal and geographical correlation to filter coincidental similarities. For instance, reports emerging simultaneously from geographically diverse regions or across different languages may indicate a global defect, whereas clustered timing within a single domain or network may suggest localized anomalies. ML implementations may employ embeddings that capture semantic and temporal proximity, enabling the model to automatically infer when multiple reports refer to the same underlying issue even if phrased differently. As new corroborating evidence is collected, the weighting engine 410 may incrementally update confidence scores to reflect the evolving consensus among independent data sources.

Based on at least the foregoing factors, the present invention may calculate an overall weighted score indicating the likelihood of success or the likelihood of failure of implementing a patch. By way of illustration, the system may treat a scenario in which substantially all users across substantially all trusted sources report experiencing the same failure or where the patch vendor has formally identified a defect as indicative of a community-informed risk approaching its maximum value. Reports originating from different sources may contribute unequally to this score; for example, a highly credible source may increase the assessed risk to a materially greater degree (e.g., to approximately 0.20) than a less-established source reporting the same behavior (e.g., to approximately 0.25). The system may also account for the order and substance of the reports. An initial mention of an issue in a lower-credibility source may raise the score only modestly (e.g., to 0.07), while a later discussion of that same report within a higher-credibility source without new primary evidence may result in a more moderate increment (e.g., to 0.10). In some embodiments, the final weighted score is then contextualized using severity information to generate a recommended action classification such as "Appears Stable," "Known Issues," or "Caution." For example, a score below a first adjustable threshold (e.g., 0.05) may be treated as stable, scores between the first and second thresholds (e.g., 0.05-0.10) may indicate known issues, and scores above the second threshold may trigger a cautionary recommendation. Other ranges, scaling models, and classification schemes may be used in alternative embodiments.

Together, the weighting dimensions of volume, relevance, severity, and consistency provide a multi-parameter framework for quantifying patch risk. Each dimension may operate under technician-defined policy constraints or may be adaptively tuned through a ML model, such as ML model 400 described below, based on historical performance outcomes. By combining these independent yet interrelated factors, the patch management server 100 achieves a nuanced evaluation that balances quantitative measures with qualitative insights, ensuring that risk assessments accurately reflect both the scope and the credibility of reported issues.

At step 212, the patch management server 100 generates a risk profile for the patch based on the weighted evaluation of vendor-supplied patch data, community-sourced patch data, and/or platform-based data. In general, this step provides a normalization process in which disparate and potentially qualitative data sources are transformed into a structured, bounded representation that can be consistently interpreted. In some embodiments, threshold values may be applied during generation of the bounded risk representation, such that the weighting output is mapped directly to categorical or otherwise bounded values according to technician-defined or adaptively determined thresholds. The risk profile may take the form of a numerical score, a categorical designation (e.g., low, medium, and high risk), a probabilistic estimate of potential failure, or another normalized representation derived from the evaluation. By mapping unstructured findings to defined values or categories, the system enables both automated and human decision makers to understand and act upon the evaluation. The risk profile may be generated on a per-device basis, a per-group basis, or globally for all client devices 102, and its particular form may vary according to system design preferences or administrative requirements.

At step 214, the system may provide the risk profile to the technician computer system 106 for review, modification, or confirmation. The technician may adjust thresholds, apply additional contextual knowledge, or override system recommendations in whole or in part. In some embodiments, the technician computer system 106 may display the risk profile in a graphical interface, provide alerts or notifications, or generate reports summarizing the evaluation. In other embodiments, step 214 is skipped, and the system proceeds automatically to step 216, without human review, to initiate deployment actions using the risk profile as a basis for deploying a patch or taking alternative actions as described with reference to subsequent figures.

As will be explained in herein, the risk profile may be compared to threshold values or mapped to designated structured categories that directly trigger automated system actions. For example, a risk profile indicating no detected issues may cause the system to initiate deployment of the patch across some or all client devices 102. A risk profile indicating a medium likelihood of failure (e.g., a risk of business disruption greater than or equal to 10%) may cause the system to defer deployment and schedule a subsequent evaluation after a predetermined number of days. A risk profile indicating a high likelihood of failure may cause the system to generate an alert for the technician computer system 106 and recommend withholding deployment of the patch across the environment. These examples are illustrative, and other mappings between bounded risk profile outputs and automated system actions may likewise be employed.

The processes described in FIG. 2 collectively enable the patch management server 100 to transform disparate data sources into structured, actionable representations and/or actions. For example, community-sourced patch data may be unstructured, qualitative, and inconsistent across sources (e.g., a forum post describing "sound stopped working after update" or a bulletin reporting "driver instability on version X"). By applying weighting factors such as source credibility, volume of occurrence, and/or relevance to the deployment environment, the patch management server 100 normalizes these varied findings into structured attributes that can be consistently analyzed and used to execute deployment actions consistent with the patch data across various sources.

The vendor-supplied patch data and platform-based data may also be obtained in disparate and heterogeneous formats, data types, and representations. Vendor-supplied patch data may arrive as vendor-supplied XML manifests, JSON metadata, plain-text release notes, binary configuration files, or proprietary package descriptors, while platform-based data may be collected as structured logs, time-series metrics, sensor streams, or system event messages. As such, some aspects of the present invention apply data normalization and mapping processes to transform these disparate formats into structured, actionable representations suitable for quantitative analysis.

In some embodiments, the patch management server 100 employs a data transformation engine that parses incoming vendor-supplied patch data, community-sourced patch data, and/or platform-based data into a unified schema. The transformation engine may extract semantic fields such as patch identifier, affected components, change type, device identifier, installation timestamp, timestamp of discussion, and performance metric values. Data extraction may rely on pattern-based parsers, regular-expression templates, or schema inference algorithms capable of identifying field boundaries without prior knowledge of format. The normalized output may then be serialized into a common structure (e.g., key-value tables or hierarchical JSON objects) compatible with downstream weighting and risk analysis components.

In other embodiments, the system may apply feature engineering and encoding techniques to prepare telemetry data for integration with qualitative patch information. For example, continuous metrics such as CPU utilization or crash frequency may be discretized into categorical levels (e.g., low, medium, high) or standardized to z-scores to facilitate correlation with patch metadata. Log messages may be vectorized using tokenization and embedding models to capture semantic similarity between device events and reported issues. In ML configurations, these encoded features may be supplied to the feature-extraction engine 408 described with reference to FIG. 4 for downstream weighting and normalization.

The mapping process may further include cross-referencing and alignment between vendor-supplied patch data (e.g., patch descriptors) and platform-based data (e.g., telemetry fields). For instance, a patch manifest indicating an updated network driver may be programmatically linked to telemetry metrics tracking packet loss or driver latency for affected devices. Likewise, if vendor-supplied patch metadata specifies a changed system file or registry key, corresponding telemetry events referencing those components may be automatically associated. This mapping allows the patch management server 100 to correlate cause (the patch's modifications) with effect (telemetry outcomes), creating a unified feature space that supports accurate weighting and risk evaluation.

In some aspects, data mapping and transformation parameters may be technician-configurable through the technician computer system 106, allowing administrators to define field mappings, scaling functions, or categorical thresholds specific to their environments. Alternatively, the ML model may automatically infer optimal feature transformations by analyzing correlations between raw telemetry attributes and previously labeled deployment outcomes. Over time, the model may adapt its feature extraction and normalization routines to accommodate evolving data sources, patch formats, or telemetry schemas, ensuring continued compatibility and analytical accuracy across heterogeneous systems.

Once weighted and normalized, the combined vendor-supplied patch data, community-sourced patch data, and/or platform-based data are transformed into a bounded representation referred to herein as a risk profile. The risk profile may take the form of a numerical score, a categorical designation (e.g., low, medium, high), a probabilistic estimate of potential failure, or another normalized representation with a set range of values or classifications derived from the evaluation. By mapping unstructured findings to defined values or categories, the system enables both automated and human decision makers to understand and act upon the evaluation in a consistent manner.

The generation of a bounded risk profile provides more than an informational summary. The risk profile may be directly compared to threshold values or mapped to structured categories that trigger automated actions within the system. For example, a risk profile indicating no detected issues may cause the system to initiate deployment of the patch across some or all client devices 102. A risk profile indicating a medium likelihood of failure may cause the system to defer deployment and schedule a subsequent evaluation after a predetermined period of time. A risk profile indicating a high likelihood of failure may cause the system to generate an alert for the technician computer system 106 and recommend withholding deployment of the patch across the environment. In some embodiments, the mapping of the bounded risk profile may further or alternatively include actions such as quarantining the affected software when the system detects a severe security exposure but determines that the corresponding patch may introduce operational instability and/or automatically initiate a "test in sandbox" action in which multiple virtualized test environments are generated, the patch is applied within each such environment, and diagnostics are executed to collect additional platform-level information before any production deployment occurs.

The system may additionally select actions such as heightened monitoring of devices that receive the patch, including automatic generation of alerts upon detection of anomalous or unexpected behavior. In some aspects, these actions may be selected based on multiple dimensions of data beyond simple likelihood-of-failure scoring. For example, if a patch addresses a zero-day vulnerability, the system may evaluate the severity of the vulnerability (e.g., greater than 9 on a 10-point scale), the reachability of the vulnerability within the client environment (e.g., affecting only 10 devices out of thousands), the identity or criticality of the impacted devices (e.g., all affected devices belonging to executive personnel), and the operational risk of disruption to those users. If the disruption risk is low to medium, but insufficient platform information is available due to the recency of the zero-day event, the system may respond by executing a sandbox-based evaluation to build out additional platform data before progressing to a broader deployment. These examples illustrate possible mappings, but the system is not limited to these particular actions or thresholds.

FIG. 3 illustrates an example process flow 300 for incorporating technician input into the patch evaluation and risk profiling process. At step 302, the technician computer system 106 may present an administrative interface through which a technician can define tolerance levels, threshold values, or mappings between risk profile categories and system actions. For instance, the technician may specify that security-related benefits above a given threshold outweigh certain classes of functionality issues, or that deployment should proceed even in the presence of medium-risk findings under urgent circumstances.

At step 304, the patch management server 100 integrates these technician-defined inputs into the evaluation process. Technician inputs may be applied as weighting adjustments during the evaluation of patch data, as overrides to default threshold values, or as configuration parameters for how often the system rechecks patch data before making a deployment decision. The integration of technician inputs ensures that organizational priorities and risk tolerances are reflected in the automated evaluation process.

At step 306, the risk profile generated by the patch management server 100 may be presented to the technician through the technician computer system 106. The interface may display the numerical or categorical risk values, highlight the underlying data sources that contributed to the evaluation, and identify the system's recommended deployment action (e.g., deploy, defer, alert). In some embodiments, the technician may review the risk profile and associated recommendation and may optionally adjust threshold values, modify weighting preferences, or request additional data prior to approving or rejecting the recommendation.

At step 308, the patch management server 100 presents the recommended deployment action to the technician together with one or more selectable override options, thereby enabling the technician to affirm the recommendation, select an alternative action, or otherwise modify the proposed deployment strategy. The interface may also provide contextual explanations supporting the recommendation, such as contributing risk factors or relevant device classifications, to facilitate informed technician decision-making.

At step 310, the selected deployment action, whether the system's recommended action, a technician-modified action, or a combination thereof, is committed to the patch-management workflow. In some embodiments, committing the action comprises updating a deployment-decision record, invoking a downstream deployment-control module, enqueueing a task into a workflow engine, or otherwise signaling subsequent grouping, scheduling, or deployment processes. The committed decision forms the basis for downstream operations, including ring generation, staged rollout, or deferred reevaluation, as described in greater detail herein.

FIG. 4 illustrates an example ML model 400 implemented on or by the patch management server 100 for performing various steps in Processes 200 and/or 300, including but not limited to the weighting, normalization, and credibility assessment of patch data. Use of the ML model 400 to evaluate disparate vendor-supplied patch data, community-sourced patch data, and/or platform-based data may improve over heuristic or rule-based methods by enabling more accurate weighting of heterogeneous, qualitative reports and reducing false positives and false negatives in patch risk classification.

The ML model 400 may be realized in software, hardware, or any combination thereof, and may adopt any suitable learning architecture. Non-limiting examples include: (i) feed-forward neural networks (deep or shallow), (ii) recurrent models (e.g., gated recurrent units or long short-term memory units), (iii) attention-based or transformer models (encoder, decoder, or encoder-decoder), (iv) convolutional neural networks, (v) decision-tree ensembles (e.g., gradient-boosted trees, random forests), (vi) linear or generalized linear models, (vii) support vector machines, (viii) probabilistic graphical models (e.g., Bayesian networks), (ix) k-nearest neighbor models, and (x) ensembles or stacked models combining any of the foregoing. The selection of architecture may vary by data modality, computing budget, and desired latency.

For example, transformer-based or attention-driven architectures may process unstructured text sources such as user forums, vendor advisories, and social media reports, while gradient-boosted trees or random forests may analyze tabular telemetry data containing numeric and categorical metrics. In hybrid implementations, a neural encoder may convert textual features into embeddings that are concatenated with structured telemetry vectors, allowing a unified ensemble model to learn correlations across both modalities.

In some aspects, the ML model 400 may include one or more neural networks, where the neural network broadly refers to any computational model formed from a plurality of interconnected nodes or units arranged in one or more layers. Each node may apply a mathematical transformation to received inputs and forward the transformed output to subsequent nodes, thereby allowing the network as a whole to learn complex mappings between input and output domains. The neural network(s) may include, without limitation, feed-forward architectures, convolutional networks, recurrent or temporal networks, transformer-based models, autoencoders, generative adversarial components, or any other model that utilizes trainable numerical parameters associated with inter-node connections. During training, the neural network(s) may iteratively adjust these parameters by comparing predicted outputs to target outputs and propagating an error signal back through the layers via gradient-based or other optimization techniques. This process enables the neural network(s) to refine its internal representation of the task and improve performance over successive training cycles.

In some aspects, the ML model 400 may include any algorithm or statistical construct that is trained to generate outputs based on historical data. Such ML models may include, but are not limited to, neural networks, decision-tree models, ensemble models such as random forests or gradient-boosted machines, support vector machines, probabilistic classifiers, clustering models, regression models, or hybrid models that combine two or more learning techniques. Training of such models may involve optimizing internal parameters, selecting decision boundaries, learning probabilistic relationships, fitting regression coefficients, discovering rule sets, or otherwise adjusting model behavior based on patterns contained within labeled or unlabeled datasets. In this manner, the ML model may adapt to the available data and improve predictive accuracy or decision quality over time.

The ML model 400 may receive input features derived from vendor-supplied patch data 402, community-sourced patch data 404, and/or platform-based data 406, and may process such features through one or more submodules. A feature-extraction engine 408 may identify relevant tokens or structured fields, while a weighting engine 410 applies learned credibility weights based on prior training. The model output may pass through a normalization layer 412 and then output a bounded, interpretable value for the risk profile.

The ML model 400 may be trained on historical patch data comprising (a) vendor-supplied patch data (e.g., version identifiers, target platforms, release notes, compatibility matrices, vendor advisories, etc.), (b) community-sourced patch data (e.g., user/forum reports, third-party bulletins, enterprise support tickets, telemetry aggregates, etc.), and (c) platform-based data, such as labeled outcomes observed after deployment (e.g., successful install, rollback, device malfunction class, time-to-failure, downtime minutes, etc.). Labels may be binary, multi-class, ordinal, or real-valued (e.g., failure probability). Features may include, without limitation: source attributes (e.g., domain, publisher type, historical reliability, etc.), content signals (issue type, affected component, severity phrasing, etc.), temporal signals (e.g., report recency, burstiness, etc.), environment alignment (e.g., OS/build match to the enterprise fleet), and quantitative metrics (e.g., report counts, incidence rates, dispersion, etc.).

The ML model 400 may be trained using supervised, semi-supervised, self-supervised, or active-learning techniques. For neural models, weights may be optimized using backpropagation with first-order or second-order optimizers (e.g., gradient descent variants). Class imbalance may be addressed via reweighting, focal losses, or resampling. Continuous features may optionally be discretized (e.g., binning or clustering) to improve stability. Model outputs may be calibrated (e.g., isotonic regression or logistic/Platt scaling) so that the resulting bounded representation reflects well-calibrated likelihoods or risk levels. The model 400 may be periodically retrained or fine-tuned using new outcomes to adapt to evolving patch ecosystems.

In some embodiments, community-sourced patch data 404 that includes unstructured text is processed by a natural-language component 418. For example, the natural-language component 418 may comprise a transformer-based encoder fine-tuned to: (i) classify report credibility and severity; (ii) extract structured entities (e.g., device model, OS build, driver name); and (iii) detect stance (e.g., positive/negative outcome). The resulting structured features may be fused with tabular vendor-supplied patch data, and/or platform-based data and then scored by a decision-tree ensemble or neural scorer within the weighting engine 410. Other embodiments employ a single end-to-end model. These approaches are illustrative and other fusion strategies may be used.

During operation, the ML model 400 transforms heterogeneous inputs into the bounded risk representation. Non-limiting examples of the bounded risk representation include (a) a probability in [0, 1]; (b) a score or percentage within a defined range; or (c) a categorical level selected from a fixed set (e.g., {no-risk, medium-risk, high-risk}). This mapping converts disparate, qualitative findings into a structured output that is consistent and machine-actionable across deployments.

In one aspect, the system may compute a probabilistic risk value p using a sigmoid transformation of the weighted sum of feature inputs:

$$P = 1/(1 + e^{-w^t x}) \qquad \text{Equation 3}$$

The resulting probability is mapped to discrete risk levels—e.g., $p<0.3$=low risk, $0.3 \leq p < 0.7$=medium risk, and $p \geq 0.7$=high risk. These thresholds may be static or adaptively adjusted based on historical prediction accuracy and telemetry feedback.

The bounded risk representation may then be supplied to a deployment-decision engine 416 that compares the representation to threshold values or categories to automatically control patch deployment, including, for example: (i) initiating deployment to at least a first subset of client devices when the representation indicates no detected issues; (ii) deferring deployment and scheduling re-evaluation after a predetermined period when the representation indicates medium risk; and/or (iii) generating a notification to the technician computer system 106 and withholding deployment when the representation indicates high risk. Thresholds and mappings may be fixed, technician-configurable, or adaptively tuned using observed outcomes. Thresholds and mappings may further incorporate the credibility analysis and weighting procedures previously described above.

FIG. 5 illustrates an example process flow 500 (also referred to as the "patch deployment control process") for controlling patch deployment actions based on a bounded risk representation generated in previous steps. Process 500 represents the stage at which the normalized risk information is compared to thresholds or mapped to categorical values, and concrete deployment actions are determined and executed.

At step 502, the patch management server 100 receives a bounded risk representation from one or more sources. The bounded risk representation may be generated by the ML model 400, calculated through a deterministic algorithm executed by the server 100, or provided by a technician through manual assessment of patch data. The system may also receive accompanying metadata identifying the analysis time, data version, or confidence score associated with the representation.

At step 504, the patch management server 100 compares the received bounded risk representation against one or more threshold values or predefined categorical levels. Thresholds may be fixed, dynamically calculated by the ML model 400, or configurable by the technician computer system 106. The thresholds may correspond to quantitative score boundaries (e.g., 0.0-0.3=low risk, 0.3-0.7=medium risk, >0.7=high risk) or qualitative levels (e.g., no-issue, moderate-risk, critical-risk).

At step 506, the patch management server 100 determines a deployment action corresponding to the evaluated threshold result. Deployment actions may include, but are not limited to:

Automatic patch deployment: When the bounded risk representation indicates no detected issues or an acceptably low likelihood of adverse effects, the patch management server 100 may automatically deploy the patch to one or more client devices 102 or a defined subset of client devices 102. The subset may correspond to production systems, test groups, or devices meeting particular configuration criteria.

Staged or partial deployment: For medium-risk findings, the system may deploy the patch to a limited deployment ring of devices while deferring installation on other devices until additional community-sourced patch data and/or platform-based data are collected.

Deferred deployment: When uncertainty or moderate negative findings are detected, the server 100 may automatically defer deployment and schedule a subsequent reevaluation after a predefined period (e.g., 24-72 hours) or upon receipt of new data.

Withholding and/or alerting: For high-risk findings, the server 100 may automatically block deployment, generate a notification to the technician computer system 106, and/or recommend suspension of rollout across the environment.

Conditional technician override: In some implementations, the technician computer system 106 may override or confirm any automatically selected deployment action before execution. Such overrides may be logged and incorporated into subsequent model retraining.

At step 508, the patch management server 100 executes the appropriate action. Execution may include initiating software distribution to targeted client devices 102, updating a deployment scheduling table, or sending notifications and recommendations through the technician computer system 106. The system may perform these actions autonomously, in response to technician approval, or under guidance of the ML model 400 based on confidence levels and operational policy constraints.

At step 510, the patch management server 100 records the results of each deployment action. Recorded information may include timestamps of distribution, confirmation of installation success or failure, and platform-based data 406 reflecting post-deployment system stability. The recorded outcomes may be transmitted to a repository for future reference or provided as input to retraining processes of the ML model 400 to improve weighting and threshold accuracy.

At step 512, the patch management server 100 determines whether to restart the patch analysis process. A reevaluation may be triggered automatically when telemetry data indicates a deviation from expected performance, when new patch data becomes available, or upon the lapse of a predetermined deferral period. In other embodiments, a technician may manually request reevaluation through the technician computer system 106. When triggered, the process reinitiates one or more of the steps of process 200 to gather and analyze updated information, thereby maintaining a closed-loop adaptive patch-deployment system.

In some embodiments, a deviation from expected performance may be quantified using a numerical score or range derived from one or more device-level or environment-level telemetry signals. The patch management server 100 may calculate such scores using composite metrics formed from parameters including, but not limited to, CPU utilization, memory load, storage use, general "speed" and responsiveness, disk usage, battery depletion rate, system crashes, application crashes, or any other measurable indicators of system behavior. In some embodiments, the system may maintain a user-experience score for each device, which may be computed from a combination of device performance indicators (e.g., CPU utilization, memory load, storage consumption, responsiveness), user-submitted support tickets, system-detected events (e.g., application failures, rapid connection or disconnection from wireless networks), network-activity characteristics (e.g., unusually "chatty" applications), or other measurable signals. The definition, weighting, and composition of this user-experience score may be adaptively modified over time to accommodate evolving telemetry sources or algorithmic improvements, and in some embodiments, alternative versions may omit user-initiated actions such as ticket submissions and instead rely solely on device-level performance data. The system may further identify rapid or unexpected changes in such user-experience or device-performance scores as indicators of potential operational degradation or patch-related anomalies, prompting enhanced analysis or automatic reevaluation of the patch's impact. In addition, the system may incorporate user-configured telemetry signals defined within the patch-management environment, and may evaluate the frequency, duration, or magnitude of threshold crossings for such signals as an indicator of operational concern. The examples provided herein are non-limiting, and other types of telemetry attributes or composite scoring methods known now or developed in the future may likewise be used. These numerical or composite representations allow the system to detect departures from baseline or expected conditions and initiate reevaluation in a structured, automated manner.

At step 514, the patch management server 100 performs post-deployment monitoring and anomaly response. The platform-based data from patched devices may be continuously or periodically analyzed to detect deviations such as error spikes, performance degradation, or rollback events. If the platform-based data (e.g., telemetry data) indicates that anomaly rates satisfy a predefined threshold, the patch management server 100 may automatically execute a rollback action, restoring affected devices to their previous software state. In other embodiments, anomaly detection may prompt the server 100 to suspend further deployment or initiate immediate reevaluation via the patch analysis process. Telemetry patterns, severity levels, and rollback events recorded at this stage may also be stored and used for model retraining and refinement of deployment policies.

In some aspects, anomalies may be detected using a rolling window method, wherein the mean error rate $\mu_t$ and standard deviation at of telemetry metrics are calculated over the latest observation window. An anomaly condition is triggered when the current metric exceeds $\mu_t + k\sigma_t$ for a defined constant k (e.g., k=3). Once triggered, the patch management server 100 may automatically execute a rollback operation or initiate reevaluation through the patch analysis process.

Process 500 thereby integrates automated, and potentially human-in-the-loop, decision mechanisms, allowing the patch management server 100 to adapt deployment strategies dynamically in response to real-time data, technician preferences, and model-based predictions. The process may operate continuously, periodically, or on demand, ensuring that patch deployment remains efficient, verifiable, and responsive to post-deployment performance outcomes.

FIG. 6 illustrates an example process flow, process 600, for dynamically generating and recalculating deployment rings based on patch risk assessment results (also referred to as the "dynamic ring generation process"). Process 600 may be executed by the patch management server 100 and may operate automatically, semi-automatically under technician supervision, or under the guidance of the ML model 400. Deployment rings generated through process 600 define which subsets of client devices 102 receive a patch, in what order, and under what risk-management conditions.

At step 602, the patch management server 100 receives a bounded risk representation and in some cases the associated metadata, including but not limited to the confidence level, patch identifier, and relevant threshold mappings. The system may also incorporate technician-defined parameters provided through the technician computer system 106, such as rollout priorities, environment classifications, or excluded device groups.

At step 604, the patch management server 100 identifies candidate device populations for patch deployment. Candidate populations may be defined according to one or more device attributes, including hardware class, operating-system version, geographic region, usage profile, uptime history, and/or functional criticality. Device classification may be retrieved from a configuration management database or derived dynamically from platform-based data 406.

In some embodiments, the patch management server 100 performs rule-based device grouping, in which devices are sorted into clusters according to predefined attributes such as hardware vendor, chipset, processor family, operating system version, or installed driver set. For example, devices running the same network adapter driver version may be grouped together because they are equally susceptible to a driver-related patch defect. Rule-based grouping allows deterministic ring definition and predictable rollout control.

In some aspects, classification is performed by the machine-learned model 400 using unsupervised clustering or embedding-based similarity metrics. Each client device 102 may be represented as a multidimensional feature vector including normalized values for hardware identifiers, driver versions, OS attributes, and telemetry-derived stability metrics. Devices are clustered using algorithms such as K-means, DBSCAN, or hierarchical agglomeration to form homogeneous groups representing similar operating environments. These clusters define preliminary deployment rings that may later be dynamically restructured as telemetry similarity measures evolve. The model may embed each device's configuration vector, including hardware descriptors, installed software, and recent telemetry signatures, into a multidimensional feature space. Distances in this space represent the similarity of device environments; devices with high similarity are clustered together into coherent deployment groups. These clusters form the basis for ring generation, ensuring that patches are tested first on devices representative of broader populations.

Device classification can directly influence the risk propagation model and ring prioritization logic. For instance, if a device group exhibits anomalies during early deployment, the system increases the inferred risk for all clusters sharing similar feature profiles, thereby deferring rollout to those populations until stability is confirmed. Conversely, if a particular group demonstrates stability, its configuration characteristics may propagate a negative risk adjustment to other matching clusters, accelerating their deployment. This inter-group risk diffusion allows the system to extrapolate learned outcomes across structurally similar devices, reducing redundant testing and improving rollout efficiency.

In some aspects, classification boundaries may be technician-configurable, allowing administrators to override automatic clustering or manually define critical device classes. For example, a technician may tag production servers as "high criticality," requiring a higher confidence threshold before deployment, or designate low-impact kiosk systems as "low criticality," allowing earlier rollout. Such technician-defined constraints act as policy overlays on top of the AI-generated clusters, ensuring that operational priorities are respected even as the system dynamically refines classifications based on telemetry or other platform-based data.

The device classification process may also account for geographic or temporal context. For instance, devices within a common geographic region may share similar network latency, power profiles, or regulatory configurations that influence patch behavior. Similarly, the system may classify devices by operational schedule, such as workstations that reboot nightly versus continuously operating control systems, so that rollout timing aligns with maintenance windows. These contextual attributes are incorporated into the device's classification vector and affect both ring sequencing and telemetry interpretation thresholds.

As telemetry or other platform-based data is collected during ongoing deployments, the patch management server 100 may dynamically update device classifications. Devices may be reassigned to different clusters based on post-deployment observations, for example, if a subset of previously stable devices begins exhibiting anomalies correlated with specific driver versions or usage patterns. This continuous reclassification ensures that the deployment strategy adapts in real time, maintaining alignment between risk predictions and actual field conditions.

At step 606, the patch management server 100 generates one or more deployment rings based on risk stratification. In one example, devices exhibiting high hardware or configuration similarity to environments in which issues were previously detected may be assigned to later deployment rings, while lower-risk or more homogeneous device groups are assigned to earlier rings. The number and size of deployment rings may be variable and may expand or contract automatically as new telemetry or other platform-based data is received. Rings may be defined using clustering algorithms, rule-based logic, or outputs from the ML model 400.

At step 608, the patch management server 100 prioritizes deployment order among the generated rings. Lower-risk rings (e.g., Ring 1) may receive the patch immediately, whereas medium-risk rings (e.g., Ring 2) may be deferred for a monitoring interval, and higher-risk rings (e.g., Ring 3) may be withheld pending further evaluation. The prioritization may be guided by technician input, pre-configured policies, and/or confidence scores supplied by the ML model 400.

In some embodiments, guidance may be provided to the machine-learned model both during training and during inference to ensure that deployment decisions incorporate certain organizational or contextual considerations. For example, the patch management server 100 may include a default risk tolerance parameter defining the baseline sensitivity to detected anomalies. This default value may be scaled up or down by a technician through the technician computer system 106 to represent a higher or lower operational risk posture. During training, the ML model 400 may learn mappings between the risk tolerance parameter and past deployment outcomes, thereby aligning future risk predictions with an organization's acceptable disruption thresholds. During inference, the model may adjust its confidence bounds, ring size, or progression velocity according to the currently active tolerance level.

In addition, contextual device attributes such as the job titles or organizational roles associated with machine owners may be incorporated into the model's training and inference process. For example, systems assigned to high-impact roles (e.g., production servers, finance workstations, or executive endpoints) may be automatically classified as having a higher magnitude of disturbance if disrupted and thus assigned to later deployment rings or subject to stricter confirmation thresholds. Conversely, lower-impact or test-class devices may be assigned to early rings for exploratory deployment. These context-aware features enable the AI-guided ring generation process to align not only with technical configuration similarity but also with business-criticality considerations, thereby ensuring that patch rollout proceeds in a manner proportional to both operational and organizational risk.

At step 610, the patch management server 100 deploys the patch sequentially or concurrently according to the defined ring hierarchy. As each ring completes installation, the system collects updated telemetry data 406 reflecting post-deployment stability and performance outcomes. Telemetry or other platform-based data is analyzed in real time or near-real time to determine whether subsequent rings may safely proceed.

At step 612, the patch management server 100 performs dynamic recalculation of deployment rings in response to telemetry or other platform-based data feedback. If the platform-based data 406 indicates performance degradation or anomaly rates that satisfy a defined threshold, the system may automatically suspend deployment to remaining rings, adjust risk weightings, or merge devices into a quarantine group. Conversely, if early rings report stable outcomes, additional devices may be advanced from deferred rings for expedited deployment.

In some embodiments, the dynamic recalculation is performed by the ML model 400 using a ring allocation policy that balances safety and rollout velocity. The policy may implement risk-constrained exploration, advancing a controlled fraction of devices when the bounded risk representation 414 and early-ring platform-based data satisfy confidence thresholds, and pausing or reversing progression when anomalies exceed guardrails.

In some aspects, the system may advance or defer ring deployment based on an iterative control rule:

if $\hat{R}_k < \tau$ then advance $Ring_k+1$; otherwise, defer and recompute $\tau = f(\mu, \sigma)$, where $\hat{R}_k$ represents the observed failure probability of the current ring, $\tau$ is a safety threshold, and $\mu$, $\sigma$ are the mean and variance of prior anomaly rates. This ensures rollout proceeds only when measured risk remains below calibrated safety bounds.

The recalculation may include statistical drift detection across telemetry distributions, such as changes in crash frequency, error-code distribution, or latency variance. When a drift is detected relative to the model's baseline or prior ring data, the patch management server 100 may (i) increase the weighting of recent telemetry inputs, (ii) repartition deployment rings by hardware or geography, and/or (iii) isolate a subset of devices into a quarantine ring for additional observation.

In some embodiments, the recalculation policy is informed by key aspects of the model's training data so that inference-time adjustments mimic patterns learned from prior deployments. Training datasets may include weakly labeled, imprecise external reports (e.g., user forums, tickets, etc.) aligned post hoc with precise telemetry outcomes. The model may learn that certain latent features, such as locale configuration, input device layout, regional settings, driver microversions, or specific app plug-ins, often explain disparities between vague "symptom" narratives and observed failures. During inference, these learned explanatory features are surfaced as candidates when early-ring anomalies appear, guiding the recalculation toward high-yield partitioning of device populations.

In operation, if the first deployment ring exhibits an anomaly cluster, the patch management server 100 identifies the affected subset S of devices and computes feature commonalities across subset S relative to a contemporaneous control subset S' (e.g., devices in the same ring without anomalies, or temporally adjacent unpatched devices). Candidate discriminators are ranked using model-derived importance scores (e.g., SHAP-style contributions, information gain, or Gini reduction) and corroborated with statistical tests (e.g., enrichment ratios with multiple-hypothesis correction). Features surpassing significance thresholds are promoted as recalculation constraints.

For example, assume the initial external issue reports did not mention input language, yet platform-based data from the first ring reveals that devices experiencing the problem share a Spanish keyboard layout (or specific locale/IME configuration). The system may respond by (i) carving out an exclusion ring comprising devices matching that layout, (ii) withholding further rollout to that ring pending targeted evaluation, and (iii) advancing non-matching devices that remain within risk guardrails. This targeted omission reduces exposure while preserving rollout velocity for unaffected cohorts.

In further implementations, the features and constraints discovered during recalculation are fed back into the training data with provenance (ring, time, patch identifier, confidence, etc.), allowing subsequent model updates to internalize these high-impact discriminators. Over time, this feedback loop may reduce reliance on ad hoc heuristics by promoting recurrent, explanatory features (e.g., locale/IME, specific driver sub-versions, registry toggles, etc.) to first-class inputs in the ring-prediction and risk-estimation pipeline.

Policy guardrails may remain applicable during these adjustments. For example, organization-level risk tolerance and device criticality attributes (e.g., job title-linked business impact) may raise or lower the evidence threshold required to exclude or quarantine a cohort, or may require that high-criticality devices matching condition C remain excluded from deployment until results from a confirmatory A/B test or targeted canary evaluation are available.

In some aspects, drift may be identified when the Jensen-Shannon distance $D_{JS}$ between the recent telemetry distribution $P_t$ and baseline distribution $P_0$ exceeds a predefined threshold $\delta$ (i.e., $D_{JS}(P_t|P_0) > \delta$). When drift is detected, recent telemetry samples are upweighted in subsequent calculations, ensuring that risk estimation remains sensitive to evolving operational conditions.

In some implementations, ring progression is guided by a multi-armed bandit or Bayesian updating framework that treats each deployment ring or subgroup as an arm with an uncertain failure probability. Posterior probability estimates are updated as platform-based data arrives, and the system selects the next ring's size and composition to maximize safe deployment velocity subject to probabilistic risk constraints. Technician-defined policies, such as mandatory observation periods or maximum allowable anomaly rates, can serve as fixed boundary conditions for the AI allocator.

The recalculation logic may also include counterfactual A/B testing, in which a subset of devices within a deployment ring is intentionally withheld from receiving the patch to serve as a control group. The remaining subset receives the patch under evaluation. The patch management server 100 then compares post-deployment platform-based data between the patched and unpatched subsets to identify statistically significant differences in outcomes, such as crash rates, performance degradation, or event-log anomalies. These comparisons allow the system to infer causal relationships between patch installation and observed effects, distinguishing correlation from causation. When the analysis indicates that the patch is the likely cause of adverse outcomes, the system may automatically increase the patch's associated risk weighting, suspend further rollout, or initiate rollback actions. The results of these counterfactual evaluations may be recorded and used during retraining of the ML model 400 to improve future risk-weighting and ring-allocation strategies.

At step 614, the patch management server 100 updates the technician computer system 106 with current ring status and recommendations. The technician interface may display deployment progress, stability indicators, and risk-level deltas between iterations. In some embodiments, the technician may manually override the automatic ring progression, reorder ring sequences, and/or lock specific groups from further deployment.

At step 616, the patch management server 100 records ring outcomes and updates the historical dataset used by the ML model 400. Information such as success rates, rollback events, and anomaly distributions per ring are stored and later utilized to refine weighting functions and threshold calibration. The continuous recording of ring-specific data ensures that future patch evaluations incorporate empirical feedback from prior rollouts.

Process 600 thereby enables adaptive, data-driven control of patch deployment. By automatically generating and recalculating deployment rings based on ongoing risk assessment and platform-based data feedback, the system achieves targeted patch rollout across heterogeneous computing environments, reducing the likelihood of widespread disruption while maintaining timely security updates.

Hardware, Software, and Medium Implementations

The techniques described herein may be implemented in whole or in part using hardware, software, firmware, or any suitable combination thereof. For example, embodiments may be realized using special-purpose circuitry (e.g., application-specific integrated circuits or field-programmable gate arrays), programmable processors executing instructions, or combinations of these. Instructions stored on a non-transitory computer-readable medium, when executed by one or more processors, may cause a computing device to perform any of the steps or methods described herein.

Computing Devices and Environments

The subject matter described herein may be embodied in or executed by any suitable computing device or platform, including without limitation desktop computers, laptops, servers, tablets, smartphones, embedded controllers, or distributed/cloud-based systems. A computing device may include one or more processors, memory components, storage components, input/output interfaces, communication modules (e.g., wired or wireless transceivers), and/or display devices. Functionality may be centralized on a single device or distributed across multiple devices connected by a communication network. Input/output interfaces may include touch input, buttons, gesture-based controls, sensors, or other mechanisms as appropriate.

Computer-Readable Media and Program Code

A non-transitory computer-readable medium may include electronic, magnetic, optical, electromagnetic, or semiconductor storage devices, or any suitable combination thereof. Non-limiting examples include hard drives, solid-state drives, RAM, ROM, flash memory, CD-ROMs, and optical or magnetic storage devices. Program code stored on such a medium may be transmitted using wired or wireless connections (including but not limited to optical fiber, RF, or other communication channels) and may be written in any suitable programming language, such as procedural or object-oriented languages.

Implementation Notes and Diagrams

Flowcharts, block diagrams, and system descriptions herein represent logical groupings of functionality rather than specific hardware arrangements. Steps described in the methods may be performed in any order, including concurrently or in parallel, and additional steps may be included or omitted as appropriate. Features described with respect to one embodiment may be combined with features of another embodiment unless otherwise indicated.

The following provides an overview of some aspects of the present disclosure:

Aspect 1: A computer-implemented method for managing deployment of a software patch to a plurality of client devices, comprising: receiving, by a patch management server, vendor-supplied patch data associated with the software patch; receiving, by the patch management server, community-sourced patch data originating from one or more sources other than a patch vendor or the patch management server; receiving, by the patch management server, platform-based data originating from one or more of the client devices; applying a weighting procedure to at least a portion of the vendor-supplied patch data, the community-sourced patch data, and the platform-based data to generate a weighted evaluation of the software patch; generating, by the patch management server and based on the weighted evaluation, a bounded risk representation indicative of a likelihood that installation of the software patch will adversely affect at least one of the client devices; selecting, by the patch management server and based on the bounded risk representation, a deployment action for the software patch, the deployment action comprising at least one of: deploying the software patch to at least a first subset of the client devices; deferring deployment of the software patch; withholding deployment of the software patch; or generating a notification to a technician computer system; and executing, by the patch management server, the deployment action.

Aspect 2: The method of Aspect 1, wherein receiving the community-sourced patch data comprises accessing, via a computer network, one or more public internet forums and collecting data associated with the software patch.

Aspect 3: The method of any of Aspects 1-2, wherein receiving the platform-based data comprises collecting telemetry or performance data from one or more of the client devices via a computer network.

Aspect 4: The method of any of Aspects 1-3, wherein receiving the vendor-supplied patch data comprises accessing, via a computer network, a vendor distribution service to retrieve patch information associated with the software patch.

Aspect 5: The method of any of Aspects 1-4, wherein generating the bounded risk representation comprises applying one or more threshold values to the weighted evaluation of the software patch to map the weighted evaluation directly to one of a plurality of bounded risk representations.

Aspect 6: The method of any of Aspects 1-5, wherein applying the weighting procedure comprises evaluating the community-sourced patch data based on at least one of: a credibility score associated with a reporting source, a volume of reports referencing the software patch, a relevance of the reported issues to one or more configurations of the client devices, or a consistency of the reported issues across independent sources.

Aspect 7: The method of any of Aspects 1-6, wherein the bounded risk representation is generated on a per-device basis, on a per-group basis for a subset of the client devices, or globally for the plurality of client devices.

Aspect 8: The method of any of Aspects 1-7, wherein the weighting procedure is at least partially performed by a machine-learning model trained using historical vendor-supplied patch data, community-sourced patch data, platform-based data, and historical deployment outcomes.

Aspect 9: The method of any of Aspects 1-8, further comprising: generating, by the patch management server and based at least in part on the bounded risk representation and device classification information, a plurality of deployment rings defining different subsets of the client devices and an order in which the software patch is to be deployed to the different subsets; and deploying the software patch to the plurality of deployment rings in accordance with the order.

Aspect 10: The method of any of Aspects 1-9, further comprising dynamically recalculating, by the patch management server, at least one of the plurality of deployment rings in response to updated platform-based data indicating at least one of performance degradation, anomaly rates satisfying a threshold, or stability across one or more of the deployment rings.

Aspect 11: The method of any of Aspects 1-10, further comprising: monitoring, by the patch management server, post-deployment platform-based data for the client devices; and initiating, by the patch management server, a rollback of the software patch on at least a subset of the client devices when one or more anomaly metrics satisfy a predefined threshold.

Aspect 12: A system for managing deployment of a software patch, comprising: one or more processors; and a memory storing instructions that, when executed by the one or more processors, cause the system to acquire vendor-supplied patch data associated with the software patch; acquire platform-based data comprising telemetry or performance data collected from one or more client devices via a computer network; acquire community-sourced patch data originating from one or more external sources of data other than a patch vendor or a patch management platform; process at least a portion of the vendor-supplied patch data, the community-sourced patch data, and the platform-based data using a machine-learning model trained on historical patch data and historical deployment outcomes; generate, by the machine-learning model, a bounded risk representation indicative of a likelihood that installation of the software patch will adversely affect at least one client device; select, based on the bounded risk representation, a deployment action comprising at least one of: deploying the software patch to at least a first subset of the client devices; deferring deployment of the software patch; withholding deployment of the software patch; or generating a notification to a technician computer system; and cause execution of the deployment action on the one or more client devices.

Aspect 13: The system of Aspect 12, wherein acquiring the community-sourced patch data comprises accessing, via a computer network, one or more public internet forums and collecting data associated with the software patch.

Aspect 14: The system of any of Aspects 12-13, wherein acquiring the platform-based data comprises collecting telemetry or performance data from one or more client devices via a computer network.

Aspect 15: The system of any of Aspects 12-14, wherein acquiring the vendor-supplied patch data comprises accessing, via a computer network, a vendor distribution service to retrieve patch information associated with the software patch.

Aspect 16: The system of any of Aspects 12-15, wherein generating the bounded risk representation comprises applying one or more threshold values to a weighted evaluation of the software patch to map the weighted evaluation directly to one of a plurality of bounded risk representations.

Aspect 17: The system of any of Aspects 12-16, wherein processing the community-sourced patch data using the machine-learning model comprises evaluating the community-sourced patch data based on at least one of: a credibility score associated with a reporting source, a volume of reports referencing the software patch, a relevance of the reported issues to one or more configurations of the client devices, or a consistency of the reported issues across independent sources.

Aspect 18: The system of any of Aspects 12-17, further comprising instructions that, when executed, cause the system to generate, based at least in part on the bounded risk representation and device classification information, a plurality of deployment rings defining different subsets of the client devices and an order in which the software patch is to be deployed to the different subsets; deploy the software patch to the plurality of deployment rings in accordance with the order; and dynamically recalculate at least one of the plurality of deployment rings in response to updated platform-based data indicating at least one of performance degradation, anomaly rates satisfying a threshold, or stability across one or more of the deployment rings.

Aspect 19: The system of any of Aspects 12-18, further comprising instructions that, when executed, cause the system to monitor post-deployment platform-based data for the client devices and initiate a rollback of the software patch on at least a subset of the client devices when one or more anomaly metrics satisfy a predefined threshold.

Aspect 20: A non-transitory computer-readable medium storing instructions that, when executed by one or more processors of a patch management system, cause the processors to acquire vendor-supplied patch data associated with a software patch; acquire platform-based data comprising telemetry or performance data collected from one or more client devices via a computer network; acquire community-sourced patch data originating from one or more external sources of data other than a patch vendor or a patch management platform; process at least a portion of the vendor-supplied patch data, the community-sourced patch data, and the platform-based data using a machine-learning model trained on historical patch data and historical deployment outcomes, the processing comprising generating a bounded risk representation indicative of a likelihood that installation of the software patch will adversely affect at least one client device; generate, based at least in part on the bounded risk representation and device-classification information, a plurality of deployment rings defining different subsets of the client devices and an order in which the software patch is to be deployed; dynamically recalculate at least one of the plurality of deployment rings in response to updated platform-based data indicating at least one of performance degradation, anomaly rates satisfying a threshold, or stability across one or more of the deployment rings; select a deployment action for the software patch based on at least one of the bounded risk representation, the plurality of deployment rings, or the recalculated deployment rings; and cause execution of the selected deployment action on the client devices.

The foregoing disclosure provides illustration and description but is not intended to be exhaustive or to limit the Aspects to the precise forms disclosed. Modifications and variations may be made in light of the above disclosure or may be acquired from practice of the Aspects.

The following claims are intended to cover all of the generic and specific features of the invention described herein, and all statements of the scope of the invention that, as a matter of language, might be said to fall therebetween.

What is claimed is:

1. A computer-implemented method for managing deployment of a software patch to a plurality of client devices, comprising:

receiving vendor-supplied patch data associated with the software patch;

receiving community-sourced patch data originating from one or more sources other than a patch vendor or the plurality of client devices;

receiving platform-based data originating from one or more of the client devices;

applying a weighting procedure to at least a portion of the vendor-supplied patch data, the community-sourced patch data, and the platform-based data to generate a weighted evaluation of the software patch;

generating, based on the weighted evaluation, a bounded risk representation indicative of a likelihood that installation of the software patch will adversely affect at least one of the client devices; and executing a deployment action for the software patch based at least partially on the bounded risk representation.

2. The method of claim 1, wherein receiving the community-sourced patch data comprises accessing, via a computer network, one or more public internet forums and collecting data associated with the software patch.

3. The method of claim 1, wherein receiving the platform-based data comprises collecting telemetry or performance data from one or more client devices via a computer network.

4. The method of claim 1, wherein receiving the vendor-supplied patch data comprises accessing, via a computer network, a vendor distribution service to retrieve patch information associated with the software patch.

5. The method of claim 1, wherein generating the bounded risk representation comprises applying one or more threshold values to the weighted evaluation of the software patch to map the weighted evaluation of the software patch directly to one of a plurality of bounded risk representations.

6. The method of claim 1, wherein applying the weighting procedure comprises evaluating community-sourced patch data based on at least one of: a credibility score associated with a reporting source, a volume of reports referencing the software patch, a relevance of the reported issues to one or more configurations of the client devices, or a consistency of the reported issues across independent sources.

7. The method of claim 1, wherein the bounded risk representation is generated on a per-device basis, on a per-group basis for a subset of the client devices, or globally for the plurality of client devices.

8. The method of claim 1, wherein the weighting procedure is at least partially performed by a machine-learning model trained using historical vendor-supplied patch data, community-sourced patch data, and platform-based data together with historical deployment outcomes.

9. The method of claim 1, further comprising:

generating, by a patch management system and based at least in part on the bounded risk representation and device classification information, a plurality of deployment rings defining different subsets of the client devices and an order in which the software patch is to be deployed to the different subsets; and deploying the software patch to the plurality of deployment rings in accordance with the order.

10. The method of claim 9, further comprising dynamically recalculating, by the patch management system, at least one of the plurality of deployment rings in response to updated platform-based data indicating at least one of performance degradation, anomaly rates satisfying a threshold, or stability across one or more of the deployment rings.

11. The method of claim 1, further comprising:

monitoring, by a patch management system, post-deployment platform-based data for the client devices; and initiating, by the patch management system, a rollback of the software patch on at least a subset of the client devices when one or more anomaly metrics satisfy a predefined threshold.

12. A system for managing deployment of a software patch, comprising:

one or more processors; and a memory storing instructions that, when executed by the one or more processors, cause the system to:

acquire vendor-supplied patch data associated with the software patch;

acquire platform-based data collected from one or more client devices via a computer network;

acquire community-sourced patch data originating from one or more external sources of data other than a patch vendor or a patch management platform;

process at least a portion of the vendor-supplied patch data, the community-sourced patch data, and the platform-based data using a machine-learning model trained on historical patch data and historical deployment outcomes;

generate, by the machine-learning model, a bounded risk representation indicative of a likelihood that installation of the software patch will adversely affect at least one client device; and cause execution of a deployment action on the one or more client devices based at least partially on the bounded risk representation.

13. The system of claim 12, wherein acquiring the community-sourced patch data comprises accessing, via a computer network, one or more public internet forums and collecting data associated with the software patch.

14. The system of claim 12, wherein acquiring the platform-based data comprises collecting telemetry or performance data from one or more client devices via a computer network.

15. The system of claim 12, wherein acquiring the vendor-supplied patch data comprises accessing, via a computer network, a vendor distribution service to retrieve patch information associated with the software patch.

16. The system of claim 12, wherein generating the bounded risk representation comprises applying one or more threshold values to a weighted evaluation of the software patch to map the weighted evaluation directly to one of a plurality of bounded risk representations.

17. The system of claim 12, wherein processing the community-sourced patch data using the machine-learning model comprises evaluating the community-sourced patch data based on at least one of: a credibility score associated with a reporting source, a volume of reports referencing the software patch, a relevance of the reported issues to one or more configurations of the client devices, or a consistency of the reported issues across independent sources.

18. The system of claim 12, further comprising instructions that, when executed by the one or more processors, cause the system to:

generate, based at least in part on the bounded risk representation and device classification information, a plurality of deployment rings defining different subsets of the client devices and an order in which the software patch is to be deployed to the different subsets;

deploy the software patch to the plurality of deployment rings in accordance with the order; and dynamically recalculate at least one of the plurality of deployment rings in response to updated platform-based data indicating at least one of performance degradation, anomaly rates satisfying a threshold, or stability across one or more of the deployment rings.

19. The system of claim 12, further comprising instructions that, when executed, cause the system to:

monitor post-deployment platform-based data for the client devices; and initiate a rollback of the software patch on at least a subset of the client devices when one or more anomaly metrics satisfy a predefined threshold.

20. A non-transitory computer-readable medium storing instructions that, when executed by one or more processors of a patch management system, cause the processors to:

acquire vendor-supplied patch data associated with a software patch;

acquire platform-based data collected from one or more client devices via a computer network;

acquire community-sourced patch data originating from one or more external sources of data other than a patch vendor or a patch management platform;

process at least a portion of the vendor-supplied patch data, the community-sourced patch data, and the platform-based data using a machine-learning model trained on historical patch data and historical deployment outcomes, the processing comprising generating, by the machine-learning model, a bounded risk representation indicative of a likelihood that installation of the software patch will adversely affect at least one client device; and cause execution of a deployment action on one or more of the client devices based at least in part on the bounded risk representation.

* * * * *